(12) United States Patent
Yamaguchi et al.

(10) Patent No.: US 12,494,748 B2
(45) Date of Patent: Dec. 9, 2025

(54) BIAS CIRCUIT AND AMPLIFIER

(71) Applicant: Mitsubishi Electric Corporation, Tokyo (JP)

(72) Inventors: Yutaro Yamaguchi, Tokyo (JP); Masatake Hangai, Tokyo (JP); Shintaro Shinjo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 642 days.

(21) Appl. No.: 17/866,830

(22) Filed: Jul. 18, 2022

(65) Prior Publication Data

US 2022/0360234 A1 Nov. 10, 2022

Related U.S. Application Data

(63) Continuation of application No. PCT/JP2021/006236, filed on Feb. 19, 2021.

(30) Foreign Application Priority Data

Mar. 10, 2020 (WO) .................. PCT/JP2020/010137

(51) Int. Cl.
    H03F 3/16 (2006.01)
(52) U.S. Cl.
    CPC ....................... H03F 3/16 (2013.01)
(58) Field of Classification Search
    USPC .................................. 330/296, 285
    See application file for complete search history.

(56) References Cited

U.S. PATENT DOCUMENTS

| 4,921,814 A | 5/1990 | Ishikawa et al. |
| 4,990,973 A | 2/1991 | Ishikawa et al. |
| 6,175,267 B1 * | 1/2001 | Bree ................... H03M 1/0604 327/540 |

FOREIGN PATENT DOCUMENTS

| JP | 2-84764 A | 3/1990 |
| JP | 2015-61205 A | 3/2015 |

OTHER PUBLICATIONS

Andrei et al., "Robust Stacked GaN-Based Low-Noise Amplifier MMIC for Receiver Applications", IEEE MTT-S International Microwave Symposium 2015, total 4 pages.

(Continued)

*Primary Examiner* — Andrea Lindgren Baltzell
*Assistant Examiner* — Nareh Shamiryan
(74) *Attorney, Agent, or Firm* — Birch, Stewart, Kolasch & Birch, LLP

(57) ABSTRACT

A signal to be amplified is applied to a gate terminal of an amplifier element that amplifies the signal and that is a transistor, the bias circuit includes: a switching element having a first terminal and a second terminal, the first terminal being electrically connected to the gate terminal; and a trap compensation element having a third terminal and a fourth terminal, the third terminal being connected to the second terminal. Further, the bias circuit includes a control circuit to apply a bias voltage to the gate terminal. Further, the bias circuit includes a voltage application circuit to apply a first voltage to the fourth terminal when the signal to be amplified is a transmission signal, and apply a second voltage to the fourth terminal when the signal to be amplified is a reception signal, the second voltage being a negative voltage.

18 Claims, 15 Drawing Sheets

(56) References Cited

OTHER PUBLICATIONS

International Search Report, issued in PCT/JP2021/006236, dated May 11, 2021.
Written Opinion of the International Searching Authority, issued in PCT/JP2021/006236, dated May 11, 2021.

\* cited by examiner

US 12,494,748 B2

BIAS CIRCUIT AND AMPLIFIER

CROSS REFERENCE TO RELATED APPLICATIONS

This application is a Continuation of PCT International Application No. PCT/JP2021/006236, filed on Feb. 19, 2021, which claims priority under 35 U.S.C. 119(a) to Patent Application No. PCT/JP2020/010137, filed in Japan on Mar. 10, 2020, all of which are hereby expressly incorporated by reference into the present application.

TECHNICAL FIELD

The present disclosure relates to a bias circuit and an amplifier including the bias circuit.

BACKGROUND ART

For example, a radar system or a radio base station system may include an amplifier in addition to a transmitter and a receiver. The amplifier amplifies a transmission signal output from the transmitter and amplifies a reception signal received by the receiver.

Non-Patent Literature 1 below discloses a bias circuit of an amplifier in which an amplifier element that amplifies each of a transmission signal and a reception signal is implemented by a gallium nitride transistor (hereinafter, referred to as "GanTr"). The bias circuit applies a first bias voltage to the gate terminal of the GanTr during a period in which the GanTr amplifies the transmission signal. The bias circuit applies a second bias voltage larger than the first bias voltage to the gate terminal of the GanTr during a period in which the GanTr amplifies the reception signal.

CITATION LIST

Non-Patent Literatures

Non-Patent Literature 1: C Andrei, et al., "Robust Stacked GaN-Based Low-Noise Amplifier MMIC for Receiver Applications" IEEE MTT-S International Microwave Symposium 2015.

SUMMARY OF INVENTION

Technical Problem

GanTr generally includes crystal defects. During a period in which the transmitter is outputting a transmission signal, electrons are charged into crystal defects included in GanTr by leakage power from the transmitter. Therefore, immediately after the signal to be amplified is switched from the transmission signal to the reception signal, the vicinity of the gate terminal of GanTr is depleted. Since the vicinity of the gate terminal is depleted, the bias voltage actually applied to the gate terminal is lower than the second bias voltage. Therefore, there is a problem that the current flowing through GanTr decreases, and the gain of GanTr decreases.

The present disclosure has been made to solve the above problem, and an object of the present disclosure is to obtain a bias circuit capable of preventing a decrease in gain of an amplifier element, which occurs when a signal to be amplified is switched from a transmission signal to a reception signal.

Solution to Problem

A bias circuit in which a signal to be amplified is applied to a gate terminal of an amplifier element that amplifies the signal and that is a transistor, the bias circuit according to the present disclosure includes: a switching element having a first terminal and a second terminal, the first terminal being electrically connected to the gate terminal; a trap compensation element having a third terminal and a fourth terminal, the third terminal being connected to the second terminal; a control circuit to apply a bias voltage to the gate terminal, wherein when the signal to be amplified is a transmission signal, the control circuit performs control to cause the switching element to be in an open state and control to cause the third terminal and the fourth terminal in the trap compensation element to be in a non-conductive state in which the third terminal and the fourth terminal are electrically disconnected from each other, and when the signal to be amplified is a reception signal, the control circuit performs control to cause the switching element to be in a closed state and control to cause the third terminal and the fourth terminal to be in a conductive state in which the third terminal and the fourth terminal are electrically connected to each other; and a voltage application circuit to apply a first voltage to the fourth terminal when the signal to be amplified is a transmission signal, and apply a second voltage to the fourth terminal when the signal to be amplified is a reception signal, the second signal being a negative voltage.

Advantageous Effects of Invention

According to the present disclosure, it is possible to obtain a bias circuit capable of preventing a decrease in gain of an amplifier element, which occurs when a signal to be amplified is switched from a transmission signal to a reception signal.

DESCRIPTION OF EMBODIMENTS

In order to explain the present disclosure in more detail, a mode for carrying out the present disclosure will be described below with reference to the accompanying drawings.

First Embodiment

Figure 1:
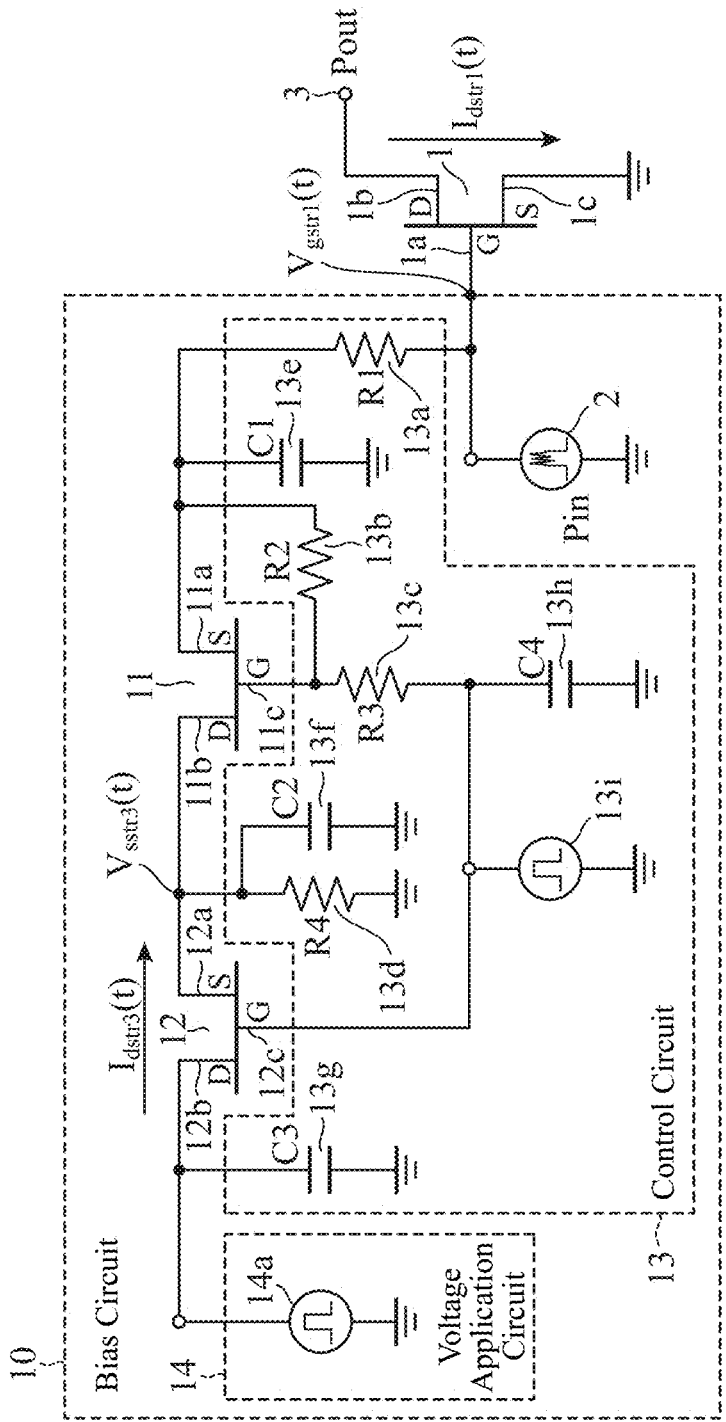
FIG. 1 is a configuration diagram illustrating an amplifier including a bias circuit 10 according to a first embodiment.

FIG. 1 is a configuration diagram illustrating an amplifier including a bias circuit 10 according to a first embodiment.

In FIG. 1, an amplifier element 1 is a transistor that amplifies a signal to be amplified applied to a gate terminal 1a. As the transistor, for example, GanTr can be used. Since the GanTr includes a field effect transistor (FET), a high electron mobility transistor (HEMT), or the like, for example, the FET or the HEMT can be used as the transistor. GanTr generally includes crystal defects.

The gate terminal 1a of the amplifier element 1 is connected to a Pin 2 to be described later, and is electrically connected to a first terminal 11a of a switching element 11 to be described later.

A drain terminal 1b of the amplifier element 1 is connected to a signal output terminal 3, and a source terminal 1c of the amplifier element 1 is connected to the ground.

Although not illustrated in the amplifier illustrated in FIG. 1, actually, an input matching circuit is connected to the gate terminal 1a of the amplifier element 1, and each of an output matching circuit and a drain bias circuit is connected to the drain terminal 1b of the amplifier element 1.

In the amplifier illustrated in FIG. 1, it is assumed that a bias voltage applied to the gate terminal 1a of the amplifier element 1 is a negative voltage. However, this is merely an example, and the bias voltage applied to the gate terminal 1a may be a positive voltage.

The Pin 2 is connected to each of the output side of a transmitter and the output side of a receiver.

The Pin 2 applies a transmission signal output from the transmitter to the gate terminal 1a of the amplifier element 1 as a signal to be amplified, and applies a reception signal output from the receiver to the gate terminal 1a of the amplifier element 1 as a signal to be amplified.

The signal output terminal 3 is a terminal for outputting a transmission signal amplified by the amplifier element 1 or a reception signal amplified by the amplifier element 1 to the outside.

The bias circuit 10 includes a switching element 11, a trap compensation element 12, a control circuit 13, and a voltage application circuit 14.

The switching element 11 is implemented by, for example, an FET included in GanTr.

The first terminal 11a of the switching element 11 is a source terminal S of the FET, and a second terminal 11b of the switching element 11 is a drain terminal D of the FET.

A control terminal 11c of the switching element 11 is a gate terminal G of the FET.

The first terminal 11a of the switching element 11 is electrically connected to the gate terminal 1a of the amplifier element 1. That is, the first terminal 11a is connected to the other end of a first resistor 13a to be described later. The first terminal 11a is connected to each of one end of a first capacitor 13e to be described later and one end of a second resistor 13b to be described later.

The second terminal 11b of the switching element 11 is connected to each of a third terminal 12a of the trap compensation element 12, one end of a fourth resistor 13d to be described later, and one end of a second capacitor 13f to be described later.

The control terminal 11c of the switching element 11 is connected to each of the other end of the second resistor 13b and one end of a third resistor 13c to be described later.

The trap compensation element 12 is implemented by, for example, an FET included in GanTr.

The third terminal 12a of the trap compensation element 12 is the source terminal S of the FET, and a fourth terminal 12b of the trap compensation element 12 is a drain terminal D of the FET.

A control terminal 12c of the trap compensation element 12 is a gate terminal G of the FET.

The third terminal 12a of the trap compensation element 12 is connected to each of the second terminal 11b of the switching element 11, one end of the fourth resistor 13d, and one end of the second capacitor 13f.

The fourth terminal 12b of the trap compensation element 12 is connected to each of a power supply 14a of the voltage application circuit 14 and one end of a third capacitor 13g to be described later.

Note that the trap compensation element 12 has crystal defects. The number of crystal defects and the size of crystal defects included in the trap compensation element 12 are desirably the same as the number of crystal defects and the size of crystal defects included in the amplifier element 1. However, the number of crystal defects and the size of crystal defects included in the trap compensation element 12 need not be necessarily the same as but may be different from the number of crystal defects and the size of crystal defects included in the amplifier element 1.

The control circuit 13 includes the first resistor 13a, the second resistor 13b, the third resistor 13c, the fourth resistor 13d, the first capacitor 13e, the second capacitor 13f, the third capacitor 13g, a fourth capacitor 13h, and a power supply 13i.

The control circuit 13 applies a bias voltage $V_{gq}$ to the gate terminal 1a of the amplifier element 1 when the signal to be amplified is a transmission signal, and applies a bias voltage $V_{gp}$ to the gate terminal 1a when the signal to be amplified is a reception signal.

The bias voltage $V_{gq}$ is a desired gate bias to be applied to the gate terminal 1a of the amplifier element 1 when the signal to be amplified is a transmission signal. The bias voltage $V_{gp}$ is a desired gate bias to be applied to the gate terminal 1a of the amplifier element 1 when the signal to be amplified is a reception signal.

In the amplifier illustrated in FIG. 1, an example in which each of the bias voltage $V_{gq}$ and the bias voltage $V_{gp}$ is a negative voltage will be described. However, this is merely an example, and each of the bias voltage $V_{gq}$ and the bias voltage $V_{gp}$ may be a positive voltage.

When the signal to be amplified is a transmission signal, the control circuit 13 performs control to cause the switching element 11 to be in an open state and control to cause the third terminal 12a and the fourth terminal 12b in the trap compensation element 12 to be in a non-conductive state in which they are electrically disconnected from each other.

When the signal to be amplified is a reception signal, the control circuit 13 performs control to cause the switching element 11 to be in a closed state and control to cause the third terminal 12a and the fourth terminal 12b in the trap compensation element 12 to be in a conductive state in which they are electrically connected to each other.

The first resistor 13a has a resistance value R1.

One end of the first resistor 13a is connected to each of the gate terminal 1a of the amplifier element 1 and the Pin 2.

The other end of the first resistor 13a is connected to each of one end of the first capacitor 13e, one end of the second resistor 13b, and the first terminal 11a of the switching element 11.

The second resistor 13b has a resistance value R2.

One end of the second resistor 13b is connected to each of the other end of the first resistor 13a, one end of the first capacitor 13e, and the first terminal 11a of the switching element 11.

The other end of the second resistor 13b is connected to each of the control terminal 12c of the switching element 11 and one end of the third resistor 13c.

The third resistor 13c has a resistance value R3.

One end of the third resistor 13c is connected to each of the other end of the second resistor 13b and the control terminal 11c of the switching element 11.

The other end of the third resistor 13c is connected to each of one end of the fourth capacitor 13h, the power supply 13i, and the control terminal 12c of the trap compensation element 12.

The fourth resistor 13d has a resistance value R4.

One end of the fourth resistor 13d is connected to each of the second terminal 11b of the switching element 11, the third terminal 12a of the trap compensation element 12, and one end of the second capacitor 13f.

The other end of the fourth resistor 13d is connected to the ground.

The first capacitor 13e has a capacitance value C1.

One end of the first capacitor 13e is connected to each of the other end of the first resistor 13a, one end of the second resistor 13b, and the first terminal 11a of the switching element 11.

The other end of the first capacitor 13e is connected to the ground.

The second capacitor 13f is provided to suppress low-frequency oscillation and has a capacitance value C2.

One end of the second capacitor 13f is connected to each of the second terminal 11b of the switching element 11, the third terminal 12a of the trap compensation element 12, and one end of the fourth resistor 13d.

The other end of the second capacitor 13f is connected to the ground.

The third capacitor 13g is provided to suppress low-frequency oscillation and has a capacitance value C3.

One end of the third capacitor 13g is connected to each of the fourth terminal 12b of the trap compensation element 12 and the power supply 14a of the voltage application circuit 14.

The other end of the third capacitor 13g is connected to the ground.

The fourth capacitor 13h has a capacitance value C4.

One end of the fourth capacitor 13h is connected to each of the other end of the third resistor 13c, the power supply 13i, and the control terminal 12c of the trap compensation element 12.

The other end of the fourth capacitor 13h is connected to the ground.

The power supply 13i is connected to each of the other end of the third resistor 13c, one end of the fourth capacitor 13h, and the control terminal 12c of the trap compensation element 12.

The power supply 13i outputs a voltage ($V_{gq}$ $V_{gq\_offset}$) when the signal to be amplified is a transmission signal, and outputs a voltage $V_{gon}$ when the signal to be amplified is a reception signal.

In the amplifier illustrated in FIG. 1, since the bias voltage applied to the gate terminal 1a of the amplifier element 1 is a negative voltage, it is assumed that each of the voltage ($V_{gq}+V_{gq\_offset}$) and the voltage $V_{gon}$ output from the power supply 13i is a negative voltage. When the bias voltage applied to the gate terminal 1a of the amplifier element 1 is a positive voltage, each of the voltage ($V_{gq}$ $V_{gq\_offset}$) and the voltage $V_{gon}$ output from the power supply 13i is a positive voltage.

The voltage application circuit 14 includes a power supply 14a.

When the signal to be amplified is a transmission signal, the voltage application circuit 14 charges electrons to the crystal defects included in the trap compensation element 12 by applying a first voltage $V_{dt1}$ to the fourth terminal 12b of the trap compensation element 12.

When the signal to be amplified is a reception signal, the voltage application circuit 14 applies a second voltage $V_{dt2}$ to the fourth terminal 12b of the trap compensation element 12, the second voltage $V_{dt2}$ being a negative voltage.

The power supply 14a outputs the first voltage $V_{dt1}$ to the fourth terminal 12b of the trap compensation element 12 when the signal to be amplified is a transmission signal, and outputs the second voltage $V_{dt2}$ to the fourth terminal 12b of the trap compensation element 12 when the signal to be amplified is a reception signal.

Next, the operation of the amplifier illustrated in FIG. 1 will be described.

In the amplifier illustrated in FIG. 1, the amplifier element 1 alternately amplifies the transmission signal and the reception signal, and outputs the amplified signal to the signal output terminal 3.

When the amplifier element 1 amplifies the transmission signal, large signal power assuming leakage power from the transmitter is applied to the gate terminal 1a of the amplifier element 1 in a pulsed manner from the Pin 2.

When the amplifier element 1 amplifies the reception signal, small signal power is applied to the gate terminal 1a of the amplifier element 1 in a pulsed manner from the Pin 2.

Hereinafter, a period during which large signal power is applied to the gate terminal 1a of the amplifier element 1 is referred to as a "high Pin period". In addition, a period during which small signal power is applied to the gate terminal 1a of the amplifier element 1 is referred to as a "low Pin period".

Figure 2:
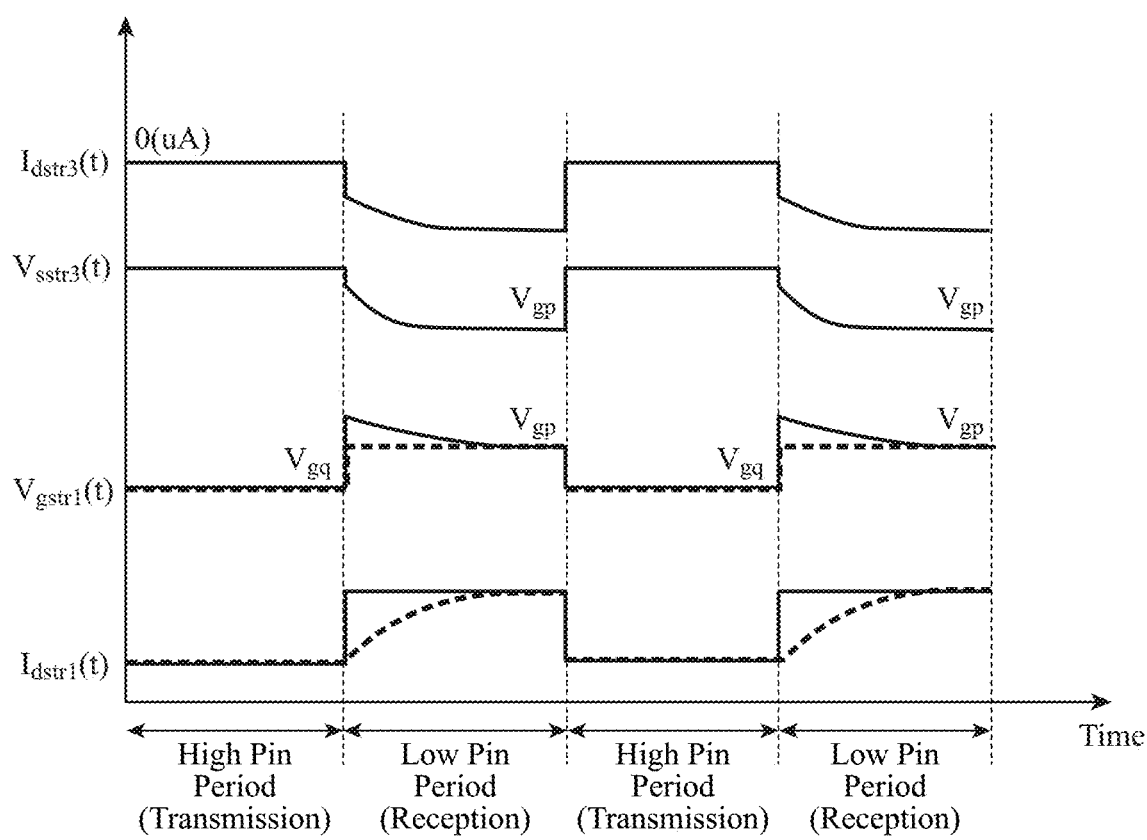
FIG. 2 is an explanatory diagram illustrating a voltage waveform and a current waveform in a high Pin period and a voltage waveform and a current waveform in a low Pin period.

FIG. 2 is an explanatory diagram illustrating a voltage waveform and a current waveform in the high Pin period and a voltage waveform and a current waveform in the low Pin period.

A $V_{gstr1}(t)$ is a voltage applied to the gate terminal 1a of the amplifier element 1, and an $I_{dstr1}(t)$ is a current flowing from the drain terminal 1b toward the source terminal 1c of the amplifier element 1.

A $V_{sstr3}(t)$ is a voltage applied to a connection point between the second terminal 11b of the switching element 11 and the third terminal 12a of the trap compensation element 12, and an $I_{dstr3}(t)$ is a current flowing from the fourth terminal 12b toward the third terminal 12a of the trap compensation element 12.

In the amplifier illustrated in FIG. 1, a threshold voltage of the FET which is the trap compensation element 12 is $V_p$, which is a negative voltage.

The power supply 13i of the control circuit 13 outputs a voltage ($V_{gq}+V_{gq\_offset}$) having an absolute value lower than the absolute value $|V_p|$ of the threshold voltage $V_p$ during the high Pin period. $|V_{gq}+V_{gq\_offset}|<|V_p|$.

When the power supply 13i outputs a voltage ($V_{gq}+V_{gq\_offset}$), the voltage ($V_{gq}+V_{gq\_offset}$) is applied to the control terminal 12c of the trap compensation element 12.

Since the absolute value $|V_{gq}+V_{gq\_offset}|$ of the voltage ($V_{gq}+V_{gq\_offset}$) is lower than the absolute value $|V_p|$ of the threshold voltage $V_p$, the third terminal 12a and the fourth terminal 12b in the trap compensation element 12 are brought into a non-conductive state in which they are electrically disconnected from each other.

The voltage ($V_{gq}+V_{gq\_offset}$) output from the power supply 13i is dropped by the third resistor 13c. The voltage ($V_{gq}+V_{gq\_offset}$)' after the drop by the third resistor 13c is applied to the control terminal 11c of the switching element 11.

In the amplifier illustrated in FIG. 1, the absolute value $|V_s|$ of the threshold voltage $V_s$ of the FET which is the switching element 11 is set to a value higher than the absolute value of the voltage ($V_{gq}+V_{gq\_offset}$)' after the drop by the third resistor 13c. Therefore, the switching element 11 is brought into an open state. That is, the first terminal 11a and the second terminal 11b in the switching element 11 are brought into a non-conductive state in which they are electrically disconnected from each other.

During the high Pin period, the current $I_{dstr3}(t)$ is 0 (μA) because the third terminal 12a and the fourth terminal 12b in the trap compensation element 12 are in a non-conductive state in which they are electrically disconnected from each other.

Since the switching element 11 is in the open state during the high Pin period, the voltage $V_{sstr3}(t)$ is a voltage invisible from the amplifier element 1. Therefore, a voltage obtained by dividing the voltage ($V_{gq}+V_{gq\_offset}$) by the first resistor 13a, the second resistor 13b, the third resistor 13c, the fourth resistor 13d, and the off-resistance of the FET which is the switching element 11 is applied as $V_{gstr1}(t)$ to the gate terminal 1a of the amplifier element 1. Note that $V_{gq\_offset}$ is an offset voltage in consideration of the above-described voltage division, and $V_{gq\_offset}$ is adjusted so that $V_{gstr1}(t)=V_{gq}$ is satisfied during the high Pin period.

When the voltage $V_{gq}$ is applied to the gate terminal 1a of the amplifier element 1, the current $I_{dstr1}(t)$ flowing from the drain terminal 1b toward the source terminal 1c of the amplifier element 1 is as illustrated in FIG. 2.

The power supply 14a of the voltage application circuit 14 outputs the first voltage $V_{dt1}$ to the fourth terminal 12b of the trap compensation element 12 during the high Pin period.

The first voltage $V_{dt1}$ is a stress bias voltage for charging electrons into the crystal defects included in the trap compensation element 12. The first voltage $V_{dt1}$ may be a positive voltage or a negative voltage.

Therefore, when the power supply 14a applies the first voltage $V_{dt1}$ to the fourth terminal 12b of the trap compensation element 12, the crystal defects included in the trap compensation element 12 is charged with electrons.

The power supply 13i of the control circuit 13 outputs a voltage $V_{gon}$ having an absolute value higher than the absolute value $|V_p|$ of the threshold voltage $V_p$ during the low Pin period. $|V_{gon}|>|V_p|$.

When the power supply 13i outputs the voltage $V_{gon}$, the voltage $V_{gon}$ is applied to the control terminal 12c of the trap compensation element 12.

Since the absolute value $|V_{gon}|$ of the voltage $V_{gon}$ is higher than the absolute value $|V_p|$ of the threshold voltage $V_p$, the third terminal 12a and the fourth terminal 12b in the trap compensation element 12 are brought into a conductive state in which they are electrically connected to each other.

The voltage $V_{gon}$ output from the power supply 13i is dropped by the third resistor 13c. The voltage $V_{gon}'$ after the drop by the third resistor 13c is applied to the control terminal 11c of the switching element 11.

In the amplifier illustrated in FIG. 1, the absolute value $|V_s|$ of the threshold voltage $V_s$ of the FET which is the switching element 11 is set to a value lower than the absolute value of the voltage $V_{gon}'$ after the drop by the third resistor 13c. Therefore, the switching element 11 is brought into a closed state. That is, the first terminal 11a and the second terminal 11b in the switching element 11 are brought into a conductive state in which they are electrically connected to each other.

The power supply 14a of the voltage application circuit 14 applies the second voltage $V_{dt2}$ to the fourth terminal 12b of the trap compensation element 12 during the low Pin period, the second voltage $V_{dt2}$ being a negative voltage.

When the power supply 14a applies the second voltage $V_{dt2}$ to the fourth terminal 12b of the trap compensation element 12, the current $I_{dstr3}(t)$ flows from the fourth terminal 12b toward the third terminal 12a of the trap compensation element 12. Since the current value of the current $I_{dstr3}(t)$ is a negative value as illustrated in FIG. 2, the actual direction of the current $I_{dstr3}(t)$ flowing through the trap compensation element 12 is the direction from the third terminal 12a to the fourth terminal 12b.

Since the power consumption of the bias circuit 10 increases as the absolute value of the current value of the current $I_{dstr3}(t)$ increases, the second voltage $V_{dt2}$ is set so that the absolute value of the current value of the current $I_{dstr3}(t)$ is minute.

During the high Pin period, electrons are charged in the crystal defects included in the trap compensation element 12, and when the high Pin period is switched to the low Pin period, electrons are transiently discharged from the crystal defects. Therefore, the current value of the current $I_{dstr3}(t)$ flowing through the trap compensation element 12 gradually decreases as illustrated in FIG. 2.

The voltage $V_{sstr3}(t)$ applied to the connection point between the second terminal 11b of the switching element 11 and the third terminal 12a of the trap compensation element 12 gradually decreases as the current value of the current $I_{dstr3}(t)$ decreases. The voltage $V_{sstr3}(t)$ is a negative voltage.

Immediately after the switching from the high Pin period to the low Pin period, the voltage $V_{sstr3}(t)$ is higher than the bias voltage $V_{gp}$ ($V_{sstr3}(t)>V_{gp}$). The voltage $V_{sstr3}(t)$ gradually decreases with time, and the voltage $V_{sstr3}(t)$ becomes substantially the same as the bias voltage $V_{gp}$ ($V_{sstr3}(t)\approx V_{gp}$). The voltage $V_{sstr3}(t)$ is a voltage divided by the on-resistance of the FET that is the trap compensation element 12 and the fourth resistor 13d, and the resistance value R4 of the fourth resistor 13d is adjusted so that the voltage applied to the gate terminal 1a of the amplifier element 1 is the bias voltage $V_{gp}$ during the low Pin period.

During the low Pin period, since the switching element 11 is in the closed state, the voltage $V_{gstr1}(t)$ applied to the gate terminal 1a of the amplifier element 1 is substantially the voltage $V_{sstr3}(t)$ ($V_{gstr1}(t)\approx V_{sstr3}(t)$). Strictly speaking, the voltage $V_{gstr1}(t)$ is lower than the voltage $V_{sstr3}(t)$ by the voltage drop by the first resistor 13a.

Therefore, immediately after the switching from the high Pin period to the low Pin period, as illustrated in FIG. 2, the voltage $V_{gstr1}(t)$ is higher than the bias voltage $V_{gp}$ similarly to the voltage $V_{sstr3}(t)$.

Similarly to the voltage $V_{sstr3}(t)$, the voltage $V_{gstr1}(t)$ gradually decreases with time and becomes substantially the same as the bias voltage $V_{gp}$ ($V_{gstr1}(t)\approx V_{gp}$).

During the high Pin period, electrons are charged into the crystal defects included in the amplifier element 1 by leakage power from the transmitter. Therefore, immediately after switching from the high Pin period to the low Pin period, the vicinity of the gate terminal 1a of the amplifier element 1 is depleted. Since the vicinity of the gate terminal 1a is depleted, the bias voltage $V_{gp}$ actually applied to the gate terminal 1a is lower than a desired bias voltage.

However, in the bias circuit 10 illustrated in FIG. 1, since the voltage $V_{gstr1}(t)$ is higher than the bias voltage $V_{gp}$ immediately after the switching from the high Pin period to the low Pin period, it is possible to prevent a problem that the bias voltage $V_{gp}$ is lower than a desired bias voltage.

Therefore, the bias circuit 10 can keep the current $I_{dstr1}(t)$ flowing from the drain terminal 1b toward the source terminal 1c of the amplifier element 1 substantially constant during the low Pin period as illustrated in FIG. 2. Since the bias circuit 10 can keep the current $I_{dstr1}(t)$ substantially constant, it is possible to prevent a decrease in gain during the low Pin period.

Hereinafter, a simulation result of the bias circuit 10 will be described.

A simulation condition for the bias circuit 10 is that the amplifier element 1 is an FET having eight 50-um gate fingers and each of the switching element 11 and the trap compensation element 12 is an FET having one 50-um gate finger. In addition, it is assumed that the bias voltage $V_{gq}=-2.25$ (V) and the bias voltage $V_{gp}=-1.4$ (V).

Figure 3:
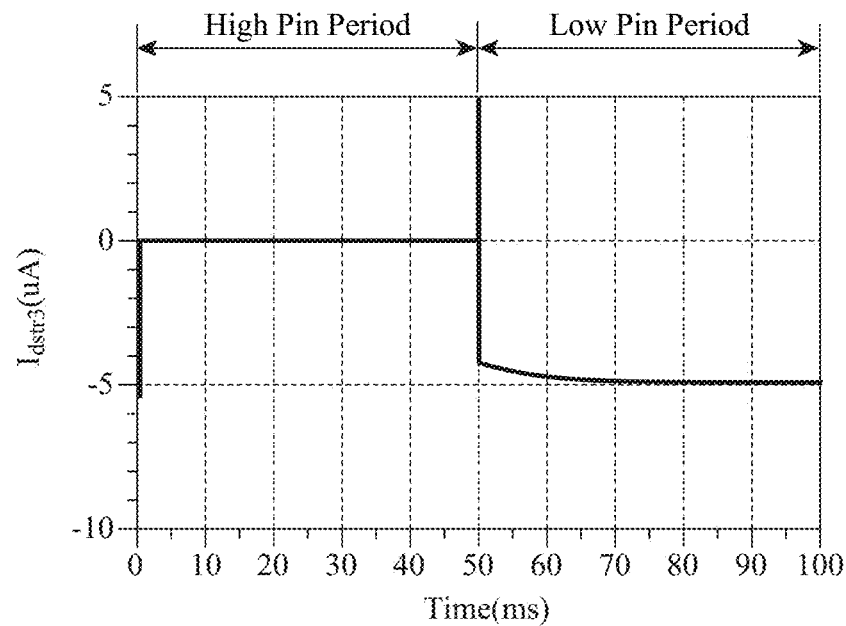
FIG. 3 is an explanatory diagram illustrating a simulation result of a current $I_{dstr3}(t)$.

FIG. 3 is an explanatory diagram illustrating a simulation result of the current $I_{dstr3}(t)$.

The simulation result illustrated in FIG. 3 indicates that the current $I_{dstr3}(t)$ is 0 (μA) during the high Pin period, and the current $I_{dstr3}(t)$ gradually decreases due to the time constant of the crystal defects included in the trap compensation element 12 during the low Pin period.

Figure 4:
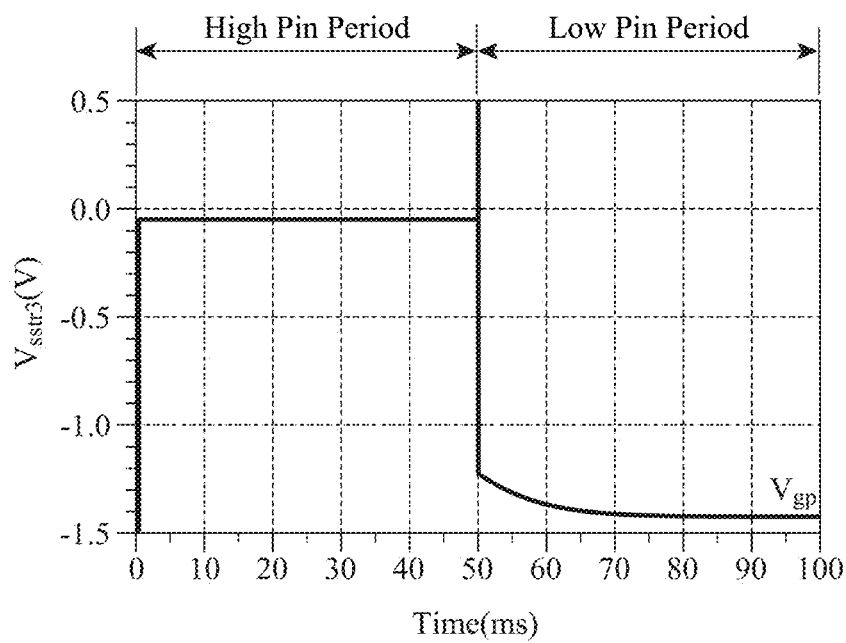
FIG. 4 is an explanatory diagram illustrating a simulation result of a voltage $V_{sstr3}(t)$.

FIG. 4 is an explanatory diagram illustrating a simulation result of the voltage $V_{sstr3}(t)$.

The simulation result illustrated in FIG. 4 indicates that the voltage $V_{sstr3}(t)$ immediately after switching from the high Pin period to the low Pin period is higher than the bias voltage $V_{gp}$ ($V_{sstr3}(t)>V_{gp}$).

The simulation result shown in FIG. 4 indicates that during the low Pin period, the voltage $V_{sstr3}(t)$ gradually decreases due to the time constant of crystal defects included in the trap compensation element 12, and finally, the voltage $V_{sstr3}(t)$ is approximately the same as the bias voltage $V_{gp}$ ($V_{sstr3}(t)\approx V_{gp}$).

Figure 5:
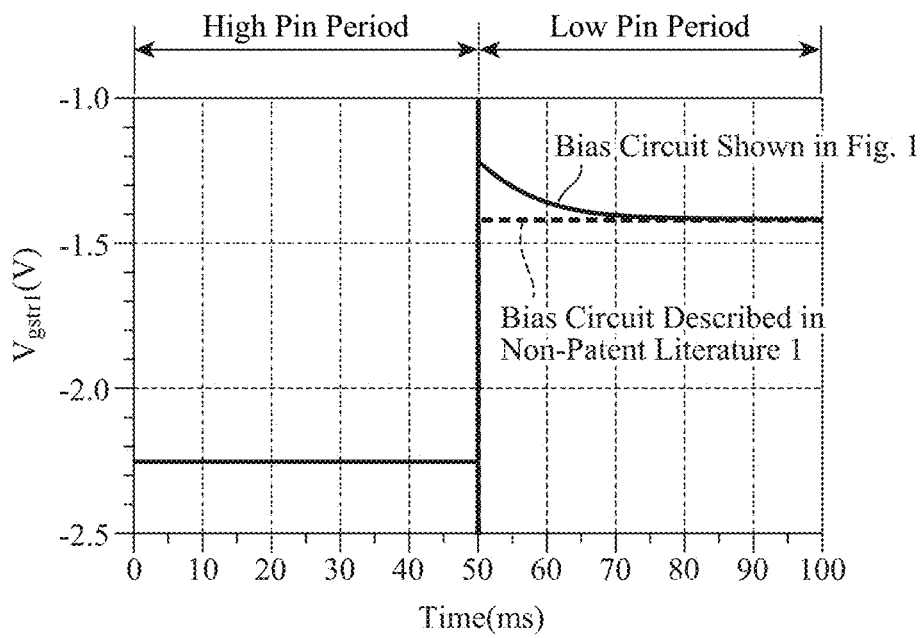
FIG. 5 is an explanatory diagram illustrating a simulation result of a voltage $V_{gstr1}(t)$.

FIG. 5 is an explanatory diagram illustrating a simulation result of the voltage $V_{gstr1}(t)$.

The simulation result illustrated in FIG. 5 indicates that the voltage $V_{gstr1}(t)$ in each of the high Pin period and the low Pin period is constant for the bias circuit described in Non-Patent Literature 1.

The simulation result illustrated in FIG. 5 indicates that, for the bias circuit 10 illustrated in FIG. 1, the voltage $V_{gstr1}(t)$ immediately after switching from the high Pin period to the low Pin period is higher than the bias voltage $V_{gp}$ ($V_{gstr1}(t)>V_{gp}$). The simulation result illustrated in FIG. 5 indicates that, during the low Pin period, the voltage $V_{gstr1}(t)$ gradually decreases due to the time constant of the crystal defects included in the trap compensation element 12, and finally, the voltage $V_{gstr1}(t)$ is substantially the same as the bias voltage $V_{gp}$ ($V_{gstr1}(t)\approx V_{gp}$).

Figure 6:
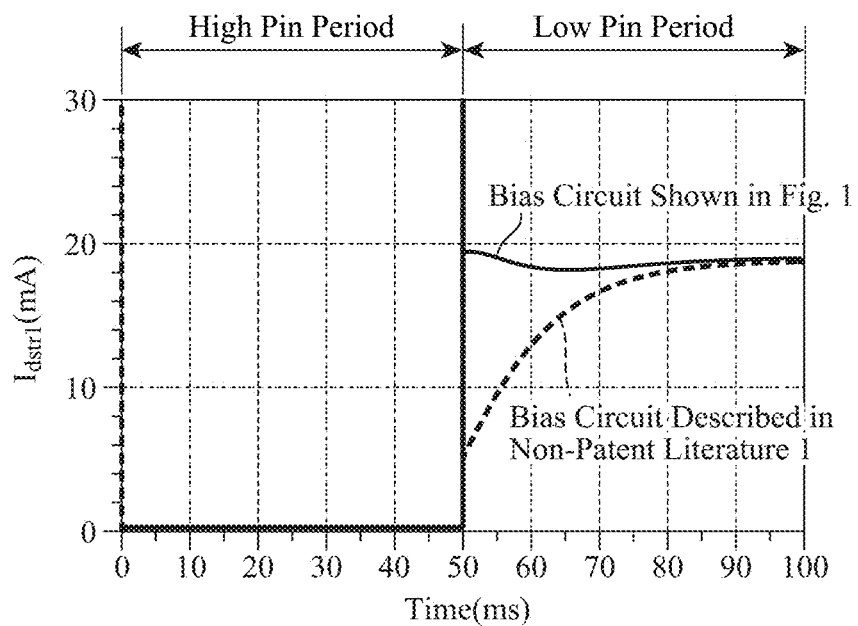
FIG. 6 is an explanatory diagram illustrating a simulation result of a current $I_{dstr1}(t)$.

FIG. 6 is an explanatory diagram illustrating a simulation result of the current $I_{dstr1}(t)$.

The simulation result illustrated in FIG. 6 indicates that, for the bias circuit described in Non-Patent Literature 1, the current $I_{dstr1}(t)$ immediately after switching from the high Pin period to the low Pin period is small, and the current $I_{dstr1}(t)$ gradually increases.

The simulation result illustrated in FIG. 6 indicates that, for the bias circuit 10 illustrated in FIG. 1, the current $I_{dstr1}(t)$ is almost constant even immediately after switching from the high Pin period to the low Pin period.

In the first embodiment described above, the bias circuit 10 includes the switching element 11 having the first terminal 11a and the second terminal 11b, the first terminal 11a being electrically connected to the gate terminal 1a of the amplifier element 1 that is a transistor and that amplifies a signal to be amplified, the signal being applied to the gate terminal 1a, and the trap compensation element 12 having the third terminal 12a and the fourth terminal 12b, the third terminal 12a being connected to the second terminal 11b. Further, the bias circuit 10 includes the control circuit 13 to apply a bias voltage to the gate terminal 1a, and when the signal to be amplified is a transmission signal, the control circuit 13 performs control to cause the switching element 11 to be in an open state and control to cause the third terminal 12a and the fourth terminal 12b in the trap compensation element 12 to be in a non-conductive state in which they are electrically disconnected from each other, and when the signal to be amplified is a reception signal, the control circuit 13 performs control to cause the switching element 11 to be in a closed state and control to cause the third terminal 12a and the fourth terminal 12b to be in a conductive state in which they are electrically connected to each other. Further, the bias circuit 10 includes the voltage application circuit 14 to apply the first voltage to the fourth terminal 12b when the signal to be amplified is a transmission signal, and apply the second voltage to the fourth terminal 12b when the signal to be amplified is a reception signal, the second voltage being a negative voltage. Therefore, the bias circuit 10 can prevent a decrease in the gain of the amplifier element 1, which occurs when the signal to be amplified is switched from the transmission signal to the reception signal.

Second Embodiment

In the bias circuit 10 illustrated in FIG. 1, an FET is used as the switching element 11.

In a second embodiment, a bias circuit 10 using a diode as a switching element 15 will be described.

Figure 7:
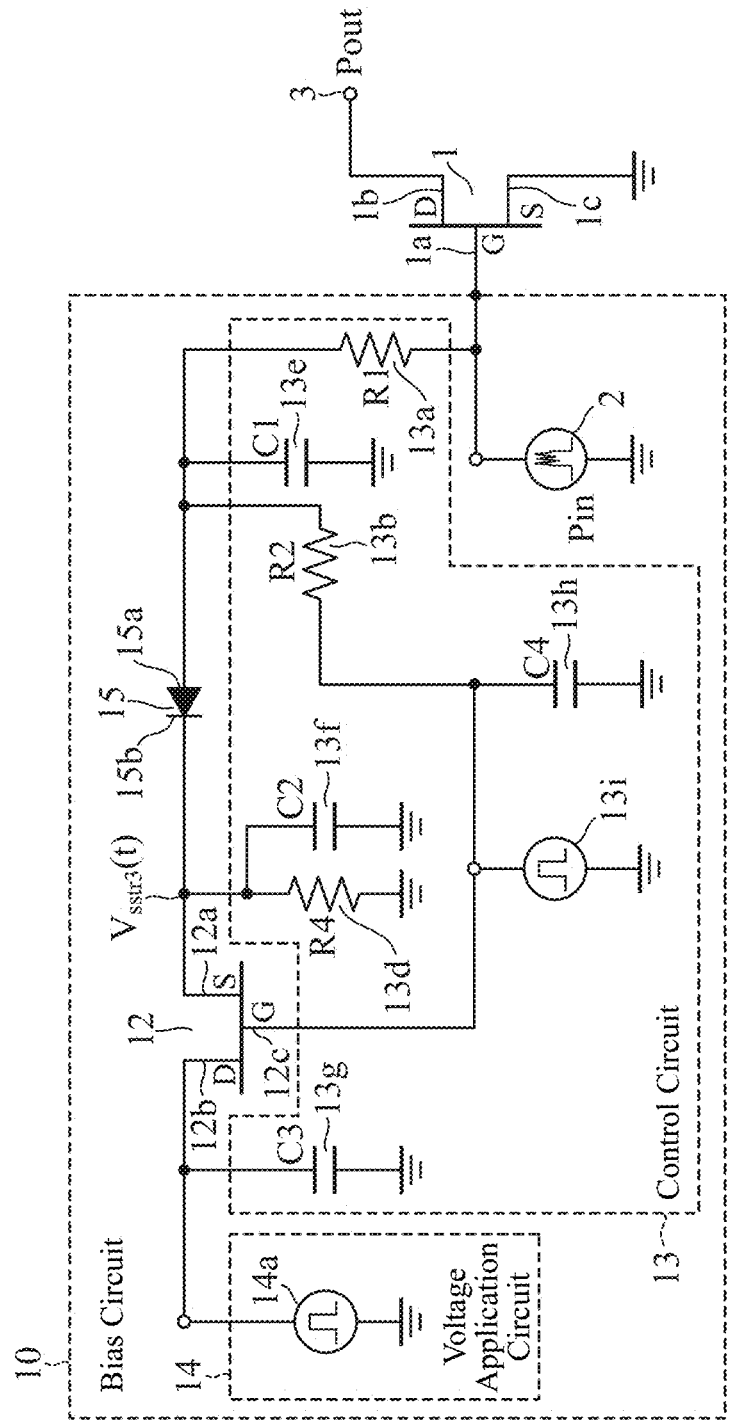
FIG. 7 is a configuration diagram illustrating an amplifier including a bias circuit 10 according to a second embodiment.

FIG. 7 is a configuration diagram illustrating an amplifier including the bias circuit 10 according to the second embodiment. In FIG. 7, the same reference numerals as those in FIG. 1 denote the same or corresponding parts, and thus description thereof is omitted.

The switching element 15 is implemented by a diode.

A first terminal 15a of the switching element 15 is an anode terminal of the diode, and a second terminal 15b of the switching element 15 is a cathode terminal of the diode.

The switching element 15 is in a closed state when the absolute value of a potential difference between a voltage applied to the first terminal 15a and a voltage applied to the second terminal 15b is higher than the absolute value $|V_D|$ of a threshold voltage $V_D$ of the diode.

The switching element 15 is in an open state when the absolute value of the potential difference between the voltage applied to the first terminal 15a and the voltage applied to the second terminal 15b is equal to or less than the absolute value $|V_D|$ of the threshold voltage $V_D$ of the diode.

In the amplifier illustrated in FIG. 7, the threshold voltage $V_D$ of the diode is a negative voltage.

Next, the operation of the amplifier illustrated in FIG. 7 will be described.

The power supply 13i of the control circuit 13 outputs a voltage $(V_{gq}+V_{gq\_offset})$ during the high Pin period.

When the power supply 13i outputs a voltage $(V_{gq}+V_{gq\_offset})$, the voltage $(V_{gq}+V_{gq\_offset})$ is applied to the control terminal 12c of the trap compensation element 12. Since the absolute value $|V_{gq}+V_{gq\_offset}|$ of the voltage $(V_{gq}+V_{gq\_offset})$ is a value lower than the absolute value $|V_p|$ of the threshold voltage $V_p$, the third terminal 12a and the fourth terminal 12b in the trap compensation element 12 are brought into a non-conductive state in which they are electrically disconnected from each other. Therefore, during the high Pin period, the voltage applied to the second terminal 15b of the switching element 15 is 0 (V).

During the high Pin period, the voltage $(V_{gq}+V_{gq\_offset})$ output from the power supply 13i is dropped by the second resistor 13b, and the voltage after the drop $(V_{gq}+V_{gq\_offset})''$ is applied to the first terminal 15a of the switching element 15.

In the amplifier illustrated in FIG. 7, the voltage $(V_{gq}+V_{gq\_offset})$ during the high Pin period is set so that the absolute value $|V_{gq}+V_{gq\_offset}|$ of $(V_{gq}+V_{gq\_offset})''$, which is the potential difference between the first terminal 15a in the switching element 15 and the fourth terminal 12b, is equal to or less than the absolute value $|V_D|$ of the threshold voltage $V_D$ of the diode. Therefore, the switching element 15 is in the open state during the high Pin period.

The power supply 13i of the control circuit 13 outputs a voltage $V_{gon}$ having an absolute value higher than the absolute value $|V_p|$ of the threshold voltage $V_p$ during the low Pin period.

When the power supply 13i outputs the voltage $V_{gon}$, the voltage $V_{gon}$ is applied to the control terminal 12c of the trap compensation element 12.

Since the absolute value $|V_{gon}|$ of the voltage $V_{gon}$ is higher than the absolute value $|V_p|$ of the threshold voltage $V_p$, the third terminal 12a and the fourth terminal 12b in the trap compensation element 12 are brought into a conductive state in which they are electrically connected to each other.

The power supply 14a of the voltage application circuit 14 applies the second voltage $V_{dt2}$ to the fourth terminal 12b of the trap compensation element 12 during the low Pin period, the second voltage $V_{dt2}$ being a negative voltage.

When the power supply 14a applies the second voltage $V_{dt2}$ to the fourth terminal 12b of the trap compensation element 12, the current $I_{dstr3}(t)$ flows from the fourth terminal 12b toward the third terminal 12a of the trap compensation element 12.

During the high Pin period, electrons are charged in the crystal defects included in the trap compensation element 12, and when the high Pin period is switched to the low Pin period, electrons are transiently discharged from the crystal defects. Therefore, the current value of the current $I_{dstr3}(t)$ flowing through the trap compensation element 12 gradually decreases as illustrated in FIG. 2.

The voltage $V_{sstr3}(t)$ applied to the connection point between the second terminal 15b of the switching element 15 and the third terminal 12a of the trap compensation element 12 gradually decreases as the current value of the current $I_{dstr3}(t)$ decreases.

Immediately after the switching from the high Pin period to the low Pin period, the voltage $V_{sstr3}(t)$ is higher than the bias voltage $V_{gp}$ ($V_{sstr3}(t)>V_{gp}$). The voltage $V_{sstr3}(t)$ gradually decreases with time, and the voltage $V_{sstr3}(t)$ becomes substantially the same as the bias voltage $V_{gp}$ ($V_{sstr3}(t) \approx V_{gp}$).

During the low Pin period, the voltage $V_{gon}$ output from the power supply 13i is dropped by the second resistor 13b, and the voltage $V_{gon}''$ after the drop is applied to the first terminal 15a of the switching element 15.

In the amplifier illustrated in FIG. 7, the voltage $V_{gon}$ during the low Pin period is set so that the absolute value of $(V_{gon}''-V_{sstr3}(t))$, which is the potential difference between the first terminal 15a in the switching element 15 and the fourth terminal 12b, is higher than the absolute value $|V_D|$ of the threshold voltage $V_D$ of the diode in the entire low Pin period. Therefore, the switching element 15 is in the closed state during the low Pin period.

As described above, similarly to the switching element 11 illustrated in FIG. 1, the switching element 15 is in the open state during the high Pin period, and is in the closed state during the low Pin period.

Third Embodiment

In the bias circuit 10 illustrated in FIG. 1, an FET is used as the switching element 11.

In a third embodiment, a bias circuit 10 using a switch as a switching element 16 will be described.

Figure 8:
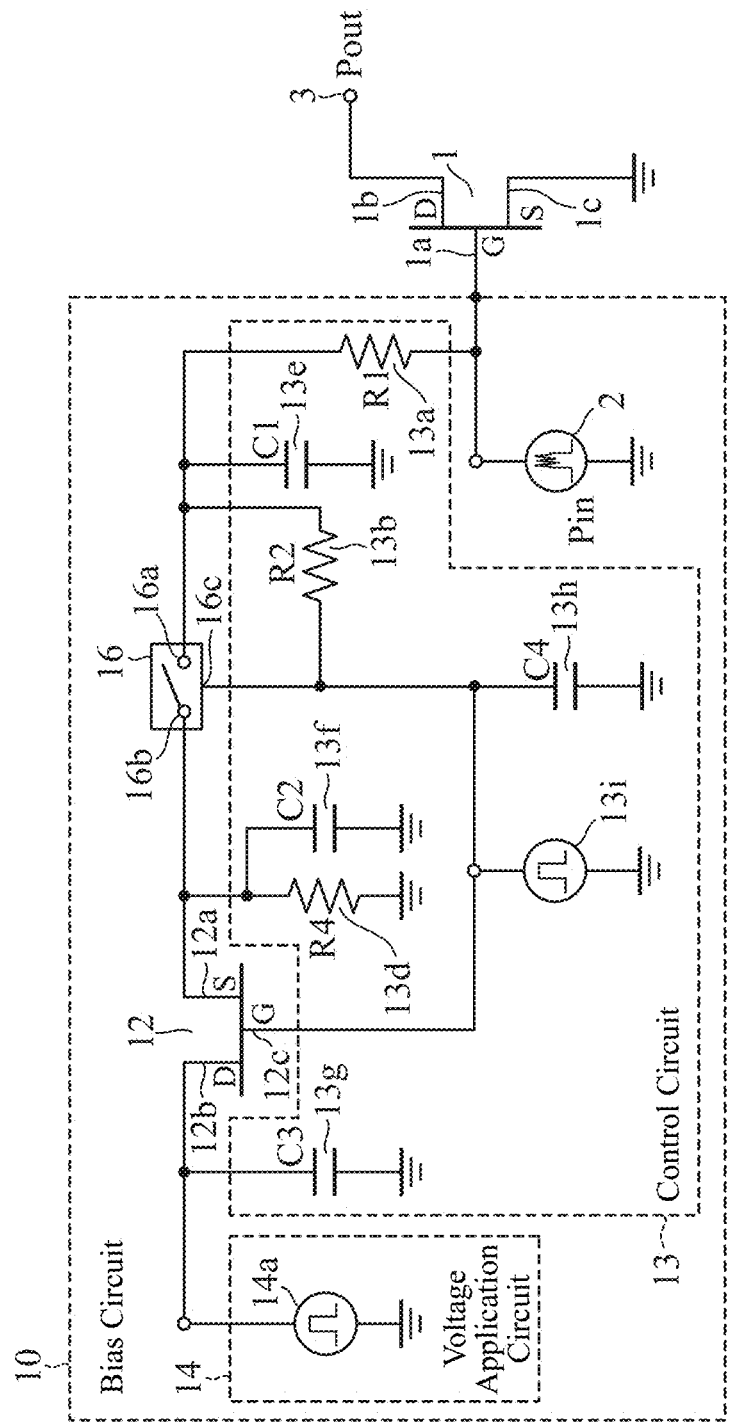
FIG. 8 is a configuration diagram illustrating an amplifier including a bias circuit 10 according to a third embodiment.

FIG. 8 is a configuration diagram illustrating an amplifier including the bias circuit 10 according to the third embodiment. In FIG. 8, the same reference numerals as those in FIG. 1 denote the same or corresponding parts, and thus description thereof is omitted.

The switching element 16 is implemented by a switch.

A first terminal 16a of the switching element 16 is electrically connected to the gate terminal 1a of the amplifier element 1. That is, the first terminal 16a is connected to the other end of the first resistor 13a. The first terminal 16a is connected to each of one end of the first capacitor 13e and one end of the second resistor 13b.

A second terminal 16b of the switching element 16 is connected to each of the third terminal 12a of the trap compensation element 12, one end of the fourth resistor 13d, and one end of the second capacitor 13f.

A control terminal 16c of the switching element 16 is connected to each of the power supply 13i of the control circuit 13, the other end of the second resistor 13b, the fourth capacitor 13h, and the control terminal 12c of the trap compensation element 12.

During the high Pin period, the power supply 13i of the control circuit 13 outputs a voltage ($V_{gq}+V_{gq\_offset}$), so that the voltage ($V_{gq}+V_{gq\_offset}$) is applied to the control terminal 16c of the switching element 16.

When the voltage ($V_{gq}+V_{gq\_offset}$) is applied to the switching element 16, the switching element 16 is brought into an open state.

During the low Pin period, the power supply 13i of the control circuit 13 outputs the voltage $V_{gon}$, so that the voltage $V_{gon}$ is applied to the control terminal 16c of the switching element 16.

When the voltage $V_{gon}$ is applied to the switching element 16, the switching element 16 is brought into a closed state.

As described above, similarly to the switching element 11 illustrated in FIG. 1, the switching element 16 is in the open state during the high Pin period, and is in the closed state during the low Pin period.

Fourth Embodiment

In the bias circuit 10 illustrated in FIG. 1, the voltage application circuit 14 includes the power supply 14a.

In a fourth embodiment, a bias circuit 10 in which a voltage application circuit 17 includes a negative feedback amplifier 18 will be described.

Figure 9:
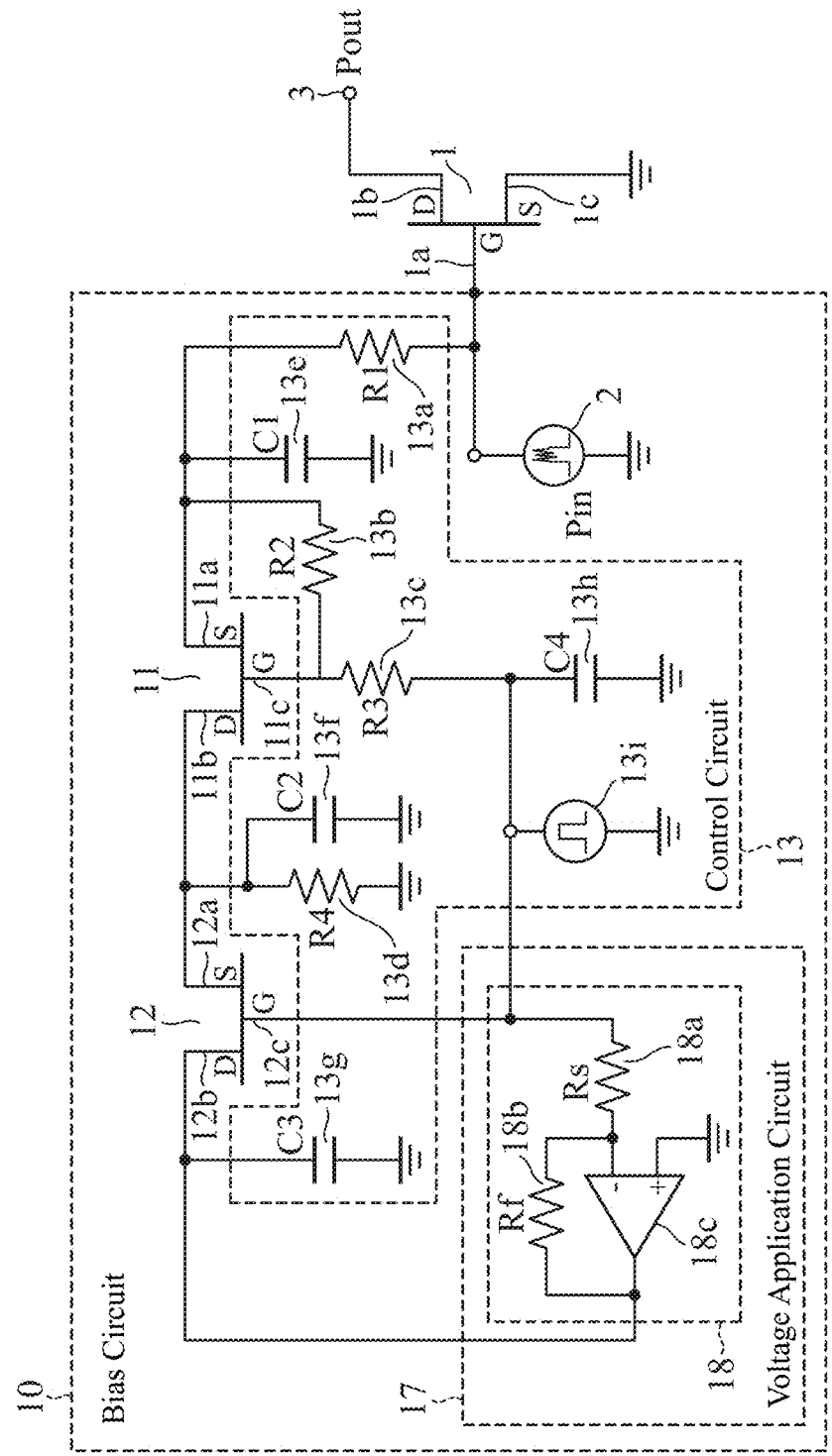
FIG. 9 is a configuration diagram illustrating an amplifier including a bias circuit 10 according to a fourth embodiment.

FIG. 9 is a configuration diagram illustrating an amplifier including the bias circuit 10 according to the fourth embodiment. In FIG. 9, the same reference numerals as those in FIG. 1 denote the same or corresponding parts, and thus description thereof is omitted.

The voltage application circuit 17 includes the negative feedback amplifier 18.

When the signal to be amplified is a transmission signal, the voltage application circuit 17 charges electrons to the crystal defects included in the trap compensation element 12 by applying a first voltage $V_{dt1}$ to the fourth terminal 12b of the trap compensation element 12.

When the signal to be amplified is a reception signal, the voltage application circuit 17 applies a second voltage $V_{dt2}$ to the fourth terminal 12b of the trap compensation element 12, the second voltage $V_{dt2}$ being a negative voltage.

The negative feedback amplifier 18 includes a resistor 18a, a resistor 18b, and an operational amplifier 18c.

In order to control the state of the trap compensation element 12 to either the non-conductive state or the conductive state, the negative feedback amplifier 18 inverts the control voltage output from the control circuit 13 to the trap compensation element 12, and applies a voltage obtained by amplifying the inverted control voltage to the fourth terminal 12b of the trap compensation element 12 as the first voltage $V_{dt1}$ or the second voltage $V_{dt2}$. The control voltage output from the control circuit 13 to the trap compensation element 12 is the voltage ($V_{gq}+V_{gq\_offset}$) in the high Pin period, and is the voltage $V_{gon}$ in the low Pin period.

The resistor 18a has a resistance value Rs.

One end of the resistor 18a is connected to each of the power supply 13i, the other end of the third resistor 13c, one end of the fourth capacitor 13h, and the control terminal 12c of the trap compensation element 12.

The other end of the resistor 18a is connected to each of one end of the resistor 18b and the inverting input terminal of the operational amplifier 18c.

The resistor 18b has a resistance value Rf.

One end of the resistor 18b is connected to each of the other end of the resistor 18a and the inverting input terminal of the operational amplifier 18c.

The other end of the resistor 18b is connected to each of the output terminal of the operational amplifier 18c, the fourth terminal 12b of the trap compensation element 12, and one end of the third capacitor 13g.

The inverting input terminal of the operational amplifier 18c is connected to each of the other end of the resistor 18a and one end of the resistor 18b.

The non-inverting input terminal of the operational amplifier 18c is connected to the ground.

The output terminal of the operational amplifier 18c is connected to each of the other end of the resistor 18b, the fourth terminal 12b of the trap compensation element 12, and one end of the third capacitor 13g.

The operational amplifier 18c inverts the control voltage applied to the inverting input terminal, and outputs a voltage obtained by amplifying the inverted control voltage from the output terminal.

In the amplifier illustrated in FIG. 9, the negative feedback amplifier 18 is applied to the amplifier illustrated in FIG. 1. However, this is merely an example, and the negative feedback amplifier 18 may be applied to the amplifier illustrated in FIG. 7 or the amplifier illustrated in FIG. 8.

Next, the operation of the amplifier illustrated in FIG. 9 will be described. In this regard, since the amplifier is similar to the amplifier illustrated in FIG. 1 except for the negative feedback amplifier 18, only the operation of the negative feedback amplifier 18 will be described here.

The negative feedback amplifier 18 inverts the voltage ($V_{gq}+V_{gq\_offset}$) output from the power supply 13i during the high Pin period, and amplifies the inverted voltage$-(V_{gq}+V_{gq\_offset})$.

The gain $A_0$ of the operational amplifier 18c included in the negative feedback amplifier 18 is expressed by the resistance value Rs of the resistor 18a and the resistance value Rf of the resistor 18b as expressed by the following equation (1).

$$A_0 = -\frac{Rf}{Rs} \qquad (1)$$

In addition, for the gain $A_0$ of the operational amplifier 18c, each of the resistance value Rs of the resistor 18a and the resistance value Rf of the resistor 18b is determined so that the voltage amplified by the operational amplifier 18c is the same as the first voltage $V_{dt1}$ as expressed by the following equation (2).

$$V_{dt1} = -(V_{gq}+V_{gq\_offset}) \times A_0 \qquad (2)$$

The negative feedback amplifier 18 applies the amplified voltage$-(V_{gq}+V_{gq\_offset}) \times A_0$ as the first voltage $V_{dt1}$ to the fourth terminal 12b of the trap compensation element 12.

The negative feedback amplifier 18 inverts the voltage $V_{gon}$ output from the power supply 13i during the low Pin period, and amplifies the inverted voltage$-V_{gon}$.

The negative feedback amplifier 18 applies the amplified voltage-$V_{gon} \times A_0$ as the second voltage $V_{dt2}$ to the fourth terminal 12b of the trap compensation element 12.

In the fourth embodiment described above, the bias circuit 10 illustrated in FIG. 9 is configured to use, as the voltage application circuit 17, the negative feedback amplifier 18 that inverts the control voltage output from the control circuit 13 to the trap compensation element 12 and applies a voltage obtained by amplifying the inverted control voltage to the fourth terminal 12b of the trap compensation element 12 as the first voltage or the second voltage in order to control the state of the trap compensation element 12 to either the non-conductive state or the conductive state. Therefore, similarly to the bias circuit 10 illustrated in FIG. 1, the bias circuit 10 illustrated in FIG. 9 can prevent a decrease in the gain of the amplifier element 1, which occurs when the signal to be amplified is switched from the transmission signal to the reception signal, and can omit the power supply 14a.

Fifth Embodiment

In a fifth embodiment, an amplifier in which each of the amplifier element 1, the switching element 11, and the trap compensation element 12 is mounted on the same substrate will be described.

Figure 10:
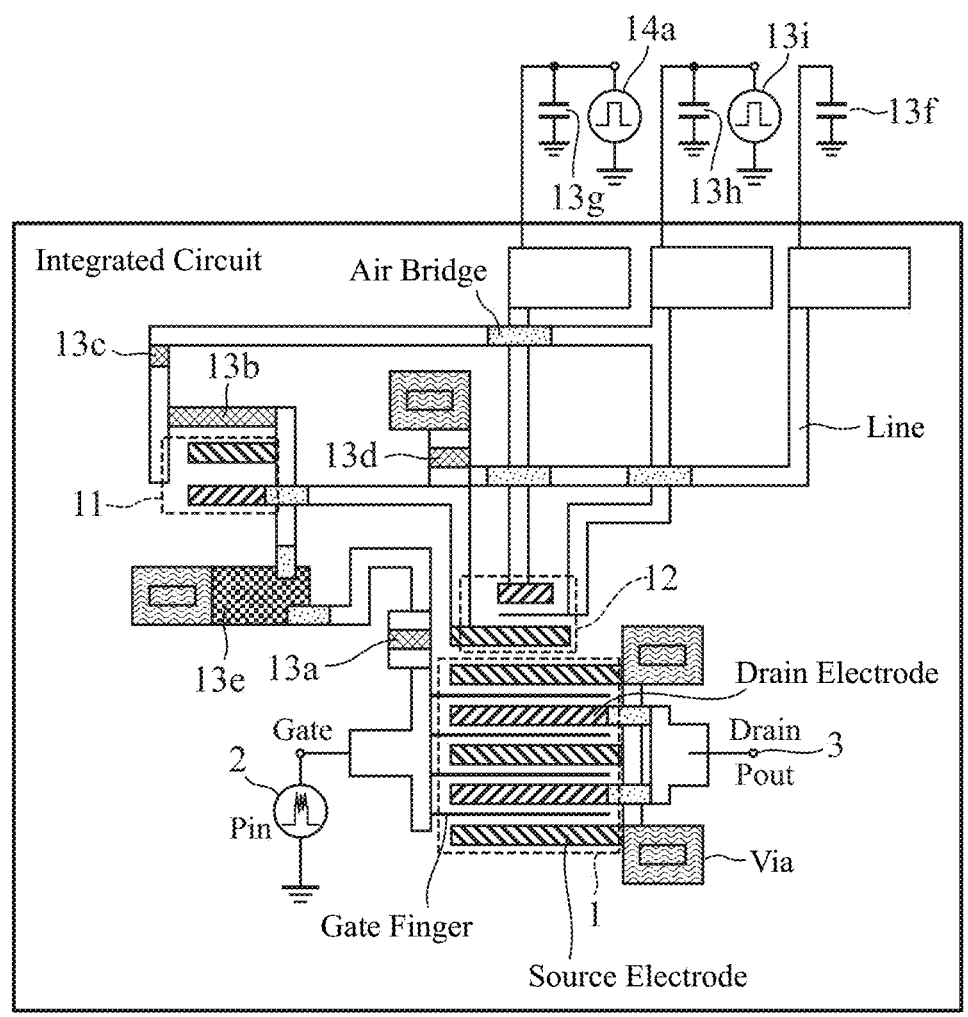
FIG. 10 is a configuration diagram illustrating an amplifier according to a fifth embodiment.

FIG. 10 is a configuration diagram illustrating an amplifier according to the fifth embodiment. In FIG. 10, the same reference numerals as those in FIG. 1 denote the same or corresponding parts, and thus description thereof is omitted.

The amplifier illustrated in FIG. 10 mounts the bias circuit 10 illustrated in FIG. 1. However, this is merely an example, and may be an amplifier in which the bias circuit 10 according to the second to fourth embodiments is mounted.

In the amplifier illustrated in FIG. 10, the FET which is the amplifier element 1, the FET which is the switching element 11, the FET which is the trap compensation element 12, the first resistor 13a, the second resistor 13b, the third resistor 13c, the fourth resistor 13d, and the first capacitor 13e are integrated on one chip.

The amplifier illustrated in FIG. 10 is an integrated circuit that implements the configuration of the amplifier illustrated in FIG. 1 using an air bridge and a line.

Since the amplifier illustrated in FIG. 10 is implemented by an integrated circuit, the bias circuit 10 illustrated in FIG. 1 can be downsized. Since the amplifier element 1 and the trap compensation element 12 can be manufactured with exactly the same transistor structure, the trap compensation element 12 includes crystal defects having the same energy level, the same capture cross-sectional area, or the same concentration as those of the amplifier element 1. Therefore, the temperature dependence of the time constant in the crystal defects included in the amplifier element 1 is substantially the same as the temperature dependence of the time constant in the crystal defects included in the trap compensation element 12. Therefore, even if the stage temperature of the amplifier changes, it is possible to prevent a decrease in the gain of the amplifier element 1, which occurs when the signal to be amplified is switched from the transmission signal to the reception signal.

Sixth Embodiment

In a sixth embodiment, a bias circuit 10 will be described in which a Schottky barrier metal forming an anode terminal of a diode implementing the switching element 15 illustrated in FIG. 7 is a metal having a work function lower than that of a Schottky barrier metal forming a gate terminal of the amplifier element 1.

Figure 11:
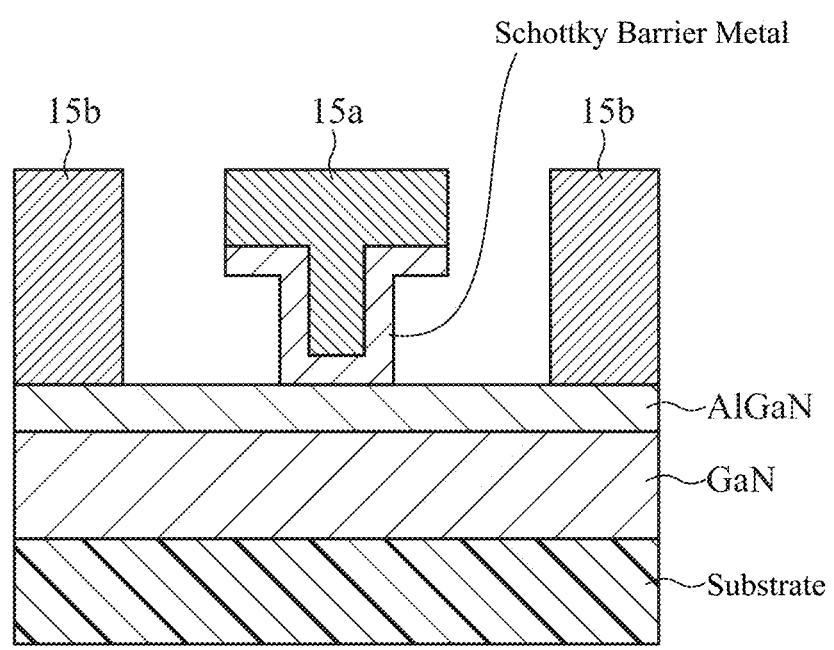
FIG. 11 is an explanatory diagram illustrating a cross-sectional structure of a diode implementing a switching element 15 illustrated in FIG. 7.

FIG. 11 is an explanatory diagram illustrating a cross-sectional structure of a diode that implements the switching element 15 illustrated in FIG. 7.

The diode implementing the switching element 15 is formed on a substrate on which Gan and aluminum gallium nitride (AlGan) are stacked.

The Schottky barrier metal forming the anode terminal of the diode is a metal having a work function lower than that of the Schottky barrier metal forming the gate terminal of the amplifier element 1.

By using a metal having a low work function as the Schottky barrier metal forming the anode terminal of the diode, the threshold voltage of the diode is close to 0 (V).

As the threshold voltage of the diode is close to 0 (V), the second voltage $V_{dt2}$ can be set to a negative voltage close to 0 (V). By setting the second voltage $V_{dt2}$ to a negative voltage close to 0 (V), the current flowing from the fourth terminal 12b to the third terminal 12a of the trap compensation element 12 can be suppressed to a minute current, and the current consumption of the bias circuit 10 can be reduced.

Seventh Embodiment

In the configuration described in the first to sixth embodiments, even if the level of the large signal power supplied from the Pin 2 to the gate terminal 1a of the amplifier element 1 changes during the high Pin period, the voltage $V_{gstr1}(t)$ applied to the gate terminal 1a of the amplifier element 1 during the low Pin period uniformly changes with time from a high voltage to a low voltage. That is, the voltage $V_{gstr1}(t)$ applied to the gate terminal 1a of the amplifier element 1 during the low Pin period uniformly changes with time from a high voltage to a low voltage regardless of the level of the large signal power applied from the Pin 2 to the gate terminal 1a of the amplifier element 1 during the high Pin period.

Therefore, there is a problem that even if the level of the large signal power applied from the Pin 2 to the gate terminal 1a of the amplifier element 1 changes during the high Pin period, the gain of the amplifier element 1 during the low Pin period uniformly changes regardless of the level of the large signal power applied from the Pin 2 to the gate terminal 1a of the amplifier element 1 during the high Pin period. Thus, in a seventh embodiment, an amplifier that can make a change in the gain of the amplifier element 1 during the low Pin period smaller than that in the configuration described in the first to sixth embodiments when the level of the large signal power applied from the Pin 2 to the gate terminal 1a of the amplifier element 1 changes during the high Pin period will be described. In the seventh embodiment, the change in the gain of the amplifier element 1 during the low Pin period is referred to as "δ Gain".

Figure 12:
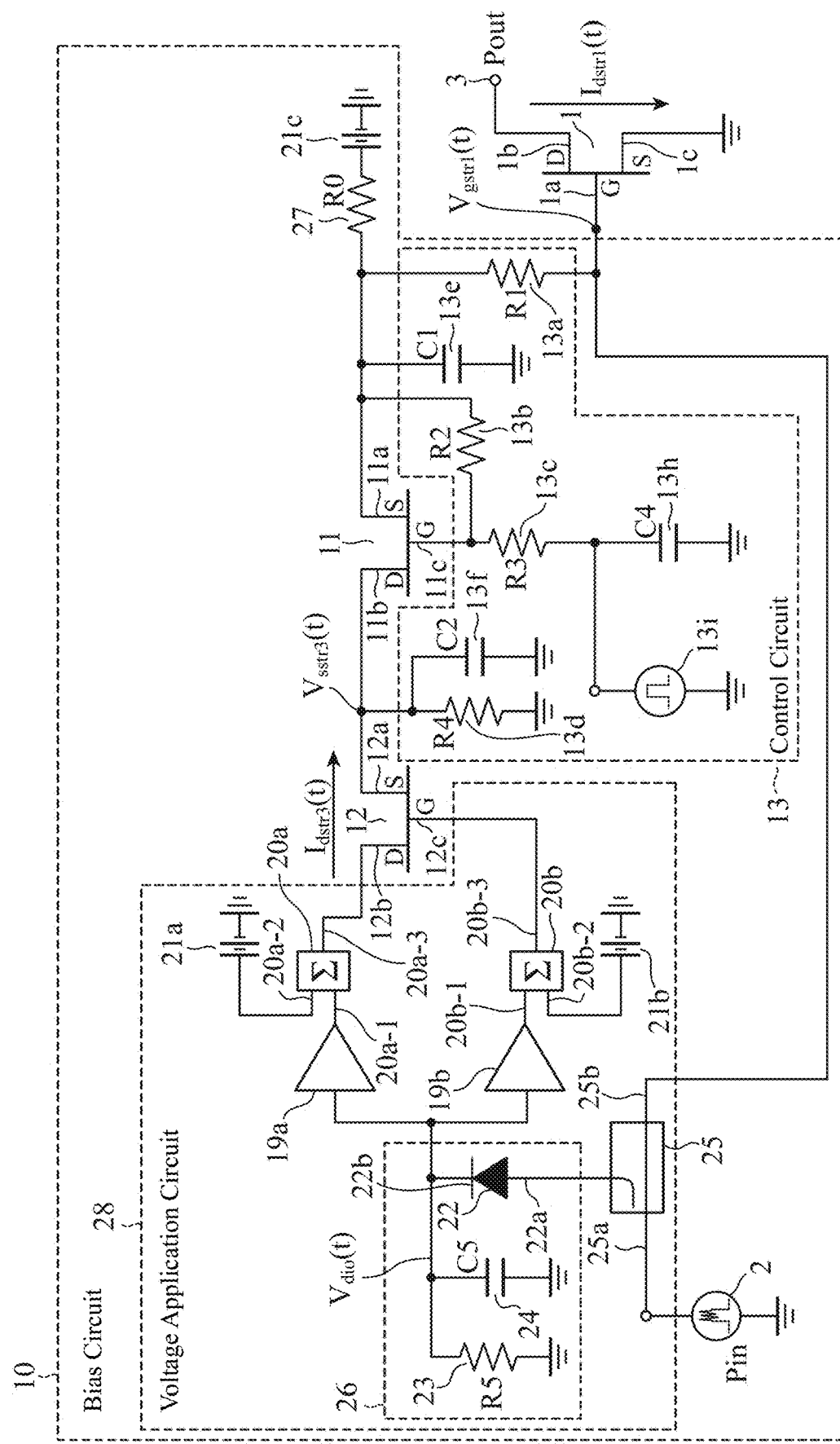
FIG. 12 is a configuration diagram illustrating an amplifier including a bias circuit 10 according to a seventh embodiment.

FIG. 12 is a configuration diagram illustrating an amplifier including a bias circuit 10 according to the seventh embodiment. In FIG. 12, the same reference numerals as those in FIG. 1 denote the same or corresponding parts, and thus description thereof is omitted.

The bias circuit 10 illustrated in FIG. 12 is different from the bias circuit 10 according to the first embodiment illustrated in FIG. 1 in that a voltage application circuit 28 is provided instead of the voltage application circuit 14. In addition, the bias circuit 10 illustrated in FIG. 12 is obtained by adding a power supply 21c and a resistor 27 to the bias circuit 10 according to the first embodiment illustrated in FIG. 1.

When the signal to be amplified is a transmission signal, the voltage application circuit 28 applies a first voltage corresponding to the power level of the transmission signal to the fourth terminal 12b of the trap compensation element 12 and applies a second voltage to the control terminal 12c of the trap compensation element 12, thereby performing control to cause the third terminal 12a and the fourth terminal 12b in the trap compensation element 12 to be in a non-conductive state in which they are electrically disconnected from each other. Further, when the signal to be amplified is a reception signal, the voltage application circuit 28 performs control to cause the third terminal 12a and the fourth terminal 12b to be in a conductive state in which they are electrically connected to each other.

The voltage application circuit 28 includes a first operational amplifier 19a, a second operational amplifier 19b, a first adder 20a, a second adder 20b, a power supply 21a, a power supply 21b, a diode 22, a resistor 23, a capacitor 24, and a coupler 25.

The coupler 25 has an input terminal 25a, a first output terminal 25b, and a second output terminal 25c. The input terminal 25a of the coupler 25 is connected to the Pin 2. The coupler 25 branches a signal input from the Pin 2 to the input terminal 25a, and outputs the branched signals to the first output terminal 25b and the second output terminal 25c.

The first output terminal 25b of the coupler 25 is connected to each of one end of the first resistor 13a of the control circuit 13 and the gate terminal 1a of the amplifier element 1. The second output terminal 25c of the coupler 25 is connected to an anode terminal 22a of the diode 22.

The anode terminal 22a of the diode 22 is connected to the second output terminal 25c of the coupler 25.

A cathode terminal 22b of the diode 22 is connected to each of one end of the resistor 23, one end of the capacitor 24, an input terminal of the first operational amplifier 19a, and an input terminal of the second operational amplifier 19b.

The resistor 23 has a resistance value R5.

One end of the resistor 23 is connected to each of one end of the capacitor 24, the cathode terminal 22b of the diode 22, the input terminal of the first operational amplifier 19a, and the input terminal of the second operational amplifier 19b.

The other end of the resistor 23 is connected to the ground.

The capacitor 24 has a capacitance value C5.

One end of the capacitor 24 is connected to each of one end of the resistor 23, the cathode terminal 22b of the diode 22, the input terminal of the first operational amplifier 19a, and the input terminal of the second operational amplifier 19b.

The other end of the capacitor 24 is connected to the ground.

The diode 22, the resistor 23, and the capacitor 24 constitute a detector 26. The detector 26 detects a voltage $V_{dio}(t)$ of the signal input to the anode terminal 22a of diode 22.

The input terminal of the first operational amplifier 19a is connected to each of one end of the capacitor 24, one end of the resistor 23, the cathode terminal 22b of the diode 22, and the input terminal of the second operational amplifier 19b.

An output terminal of the first operational amplifier 19a is connected to a first input terminal 20a-1 of the first adder 20a described later.

The input terminal of the second operational amplifier 19b is connected to each of one end of the capacitor 24, one end of the resistor 23, the cathode terminal 22b of the diode 22, and the input terminal of the first operational amplifier 19a.

An output terminal of the second operational amplifier 19b is connected to a first input terminal 20b-1 described later of the second adder 20b.

The first adder 20a has the first input terminal 20a-1, a second input terminal 20a-2, and an output terminal 20a-3.

The first input terminal 20a-1 is connected to the output terminal of the first operational amplifier 19a.

The second input terminal 20a-2 is connected to one end of the power supply 21a.

The output terminal 20a-3 is connected to the fourth terminal 12b of the trap compensation element 12.

The second adder 20b has the first input terminal 20b-1, a second input terminal 20b-2, and an output terminal 20b-3.

The first input terminal 20b-1 is connected to the output terminal of the second operational amplifier 19b.

The second input terminal 20b-2 is connected to one end of the power supply 21b.

The output terminal 20b-3 is connected to the control terminal 12c of the trap compensation element 12.

One end of the power supply 21a is connected to the second input terminal 20a-2 of the first adder 20a.

The other end of the power supply 21a is connected to the ground.

One end of the power supply 21b is connected to the second input terminal 20b-2 of the second adder 20b.

The other end of the power supply 21b is connected to the ground.

One end of the power supply 21c is connected to one end of the resistor 27.

The other end of the power supply 21c is connected to the ground.

The resistor 27 has a resistance value R0.

One end of the resistor 27 is connected to one end of the power supply 21c.

The other end of the resistor 27 is connected to the other end of the first resistor 13a of the control circuit 13.

Next, the operation of the amplifier illustrated in FIG. 12 will be described. In this regard, since the amplifier is similar to the amplifier illustrated in FIG. 1 except for the voltage application circuit 28, only the operation of the voltage application circuit 28 will be described here.

The Pin 2 outputs large signal power in a pulsed manner during the high Pin period. The signal of the large signal power output from the Pin 2 is input from the input terminal 25a of the coupler 25 to the coupler 25. The coupler 25 branches the input signal, and outputs the branched signals to each of the first output terminal 25b and the second output terminal 25c.

The signal output from the first output terminal 25b is adjusted by the power supply 21c so that the voltage is $V_{gq}$ that is a desired gate bias to be applied to the gate terminal 1a of the amplifier element 1 when the signal to be amplified is a transmission signal, and the adjusted voltage $V_{gq}$ is input to the gate terminal 1a of the amplifier element 1.

The signal output from the second output terminal 25c is input to the detector 26, and the voltage $V_{dio}(t)$ is detected by the detector 26.

Here, when the level of the large signal power output from the Pin 2 increases during the high Pin period, the voltage $V_{dio}(t)$ detected by the detector 26 increases. The voltage $V_{dio}(t)$ detected by the detector 26 is amplified by the first operational amplifier 19a, and the amplified voltage is applied to the first adder 20a. In addition, the voltage $V_{dio}(t)$ detected by the detector 26 is amplified by the second operational amplifier 19b, and the amplified voltage is applied to the second adder 20b.

The first adder 20a performs voltage adjustment between the voltage amplified by the first operational amplifier 19a and the voltage applied from the power supply 21a, and applies the adjusted voltage to the fourth terminal 12b of the trap compensation element 12. The adjusted voltage is a stress bias voltage for charging electrons to crystal defects included in the trap compensation element 12.

The second adder 20b performs voltage adjustment between the voltage amplified by the second operational amplifier 19b and the voltage applied from the power supply 21b, and applies the adjusted voltage to the control terminal 12c of the trap compensation element 12. Since the absolute value of the adjusted voltage is lower than the absolute value $|V_p|$ of the threshold voltage $V_p$ of the trap compensation element 12, the third terminal 12a and the fourth terminal 12b in the trap compensation element 12 are brought into a non-conductive state in which they are electrically disconnected from each other.

Therefore, when the level of the large signal power output from the Pin 2 increases during the high Pin period, the stress bias voltage applied to the fourth terminal 12b of the trap compensation element 12 changes. As a result, the voltage $V_{gstr1}(t)$ applied to the gate terminal 1a of the amplifier element 1 during the low Pin period also changes in accordance with the level of the large signal power output from the Pin 2 during the high Pin period.

For example, in a case where the level of the large signal power output from the Pin 2 during the high Pin period is large, the voltage $V_{gstr1}(t)$ applied to the gate terminal 1a of the amplifier element 1 during the low Pin period transiently changes from a high voltage to a low voltage, similarly to the first to sixth embodiments. On the other hand, when the level of the large signal power output from the Pin 2 during the high Pin period is small, the voltage $V_{gstr1}(t)$ applied to the gate terminal 1a of the amplifier element 1 during the low Pin period hardly changes.

As described above, the voltage $V_{gstr1}(t)$ applied to the gate terminal 1a of the amplifier element 1 during the low Pin period changes in accordance with the level of the large signal power output from the Pin 2 during the high Pin period. Therefore, by changing the level of the large signal power output from the Pin 2 during the high Pin period, the change in the gain (δ Gain) of the amplifier element 1 during the low Pin period can be suppressed to be smaller than that in the configuration described in the first to sixth embodiments.

Next, the effectiveness of the amplifier including the bias circuit 10 according to the seventh embodiment will be described in comparison with the amplifier including the bias circuit 10 according to the first embodiment.

Figure 13A:
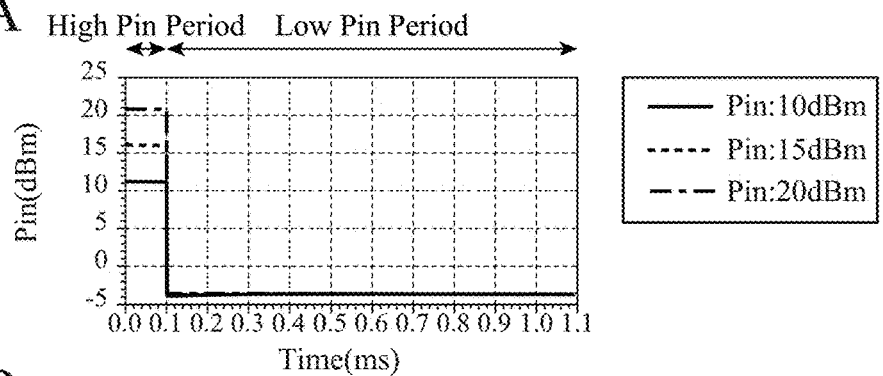
FIGS. 13A to 13E are explanatory diagrams each illustrating a transient response when the level of a large signal power output from a Pin 2 during the high Pin period is changed to 10 dBm, 15 dBm, and 20 dBm in the amplifier including the bias circuit 10 according to the first embodiment, the explanatory diagram of FIG. 13A illustrating a transient response of Pin, the explanatory diagram of FIG. 13B illustrating a transient response of Pout, the explanatory diagram of FIG. 13C illustrating a transient response of δ Gain, the explanatory diagram of FIG. 13D illustrating a transient response of $V_{gstr1}(t)$ and the explanatory diagram of FIG. 13E illustrating a transient response of $V_{sstr3}(t)$.
Figure 13B:
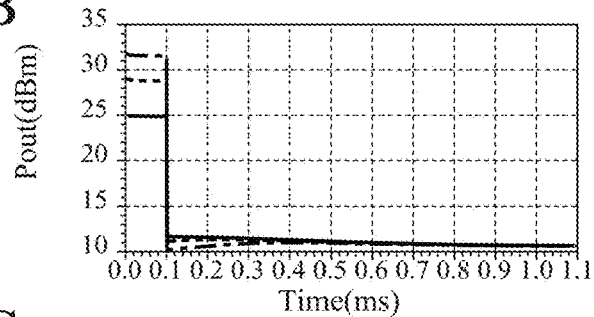
Figure 13C:
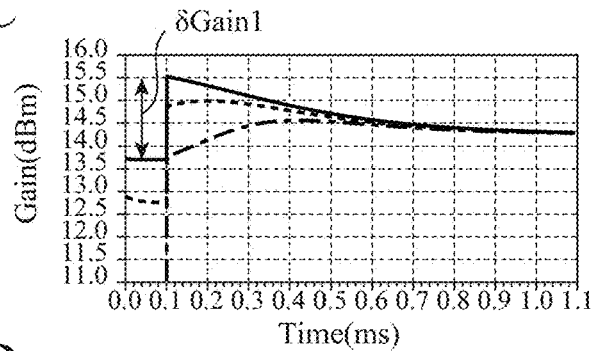
Figure 13D:
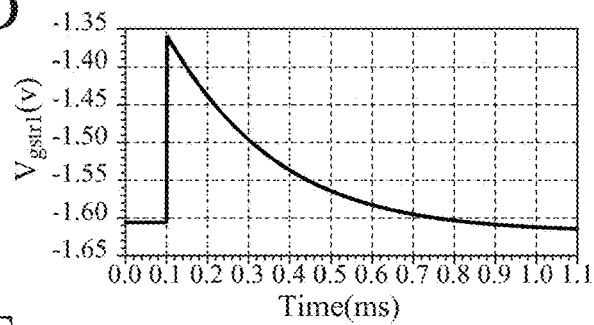
Figure 13E:
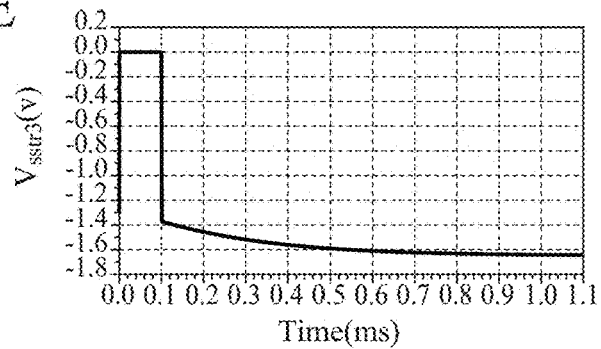

FIGS. 13A to 13E are explanatory diagrams each illustrating a transient response when the level of the large signal power output from the Pin 2 during the high Pin period is changed to 10 dBm, 15 dBm, and 20 dBm in the amplifier including the bias circuit 10 according to the first embodiment. FIG. 13A illustrates a transient response of Pin, FIG. 13B illustrates a transient response of Pout, FIG. 13C illustrates a transient response of δ Gain, FIG. 13D illustrates a transient response of $V_{gstr1}(t)$, and FIG. 13E illustrates a transient response of $V_{sstr3}(t)$.

Figure 14A:
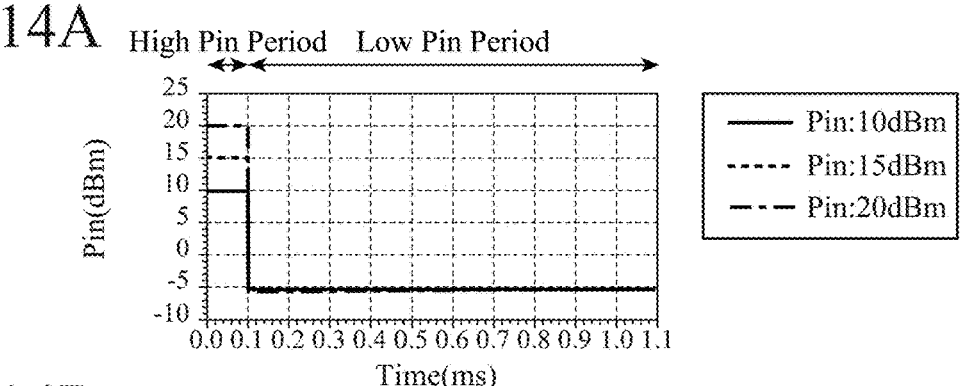
FIGS. 14A to 14E are explanatory diagrams each illustrating a transient response when the level of the large signal power output from the Pin 2 during the high Pin period is changed to 10 dBm, 15 dBm, and 20 dBm in the amplifier including the bias circuit 10 according to the seventh embodiment, the explanatory diagram of FIG. 14A illustrating a transient response of Pin, the explanatory diagram of FIG. 14B illustrating a transient response of Pout, the explanatory diagram of FIG. 14C illustrating a transient response of δ Gain, the explanatory diagram of FIG. 14D illustrating a transient response of $V_{gstr1}(t)$ and the explanatory diagram of FIG. 14E illustrating a transient response of $V_{sstr3}(t)$.
Figure 14B:
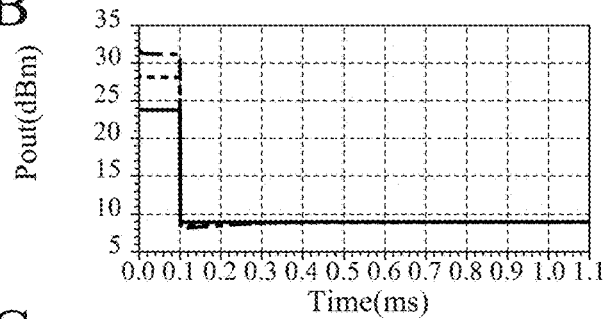
Figure 14C:
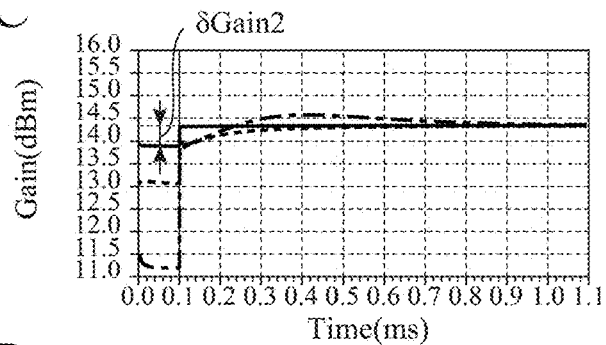
Figure 14D:
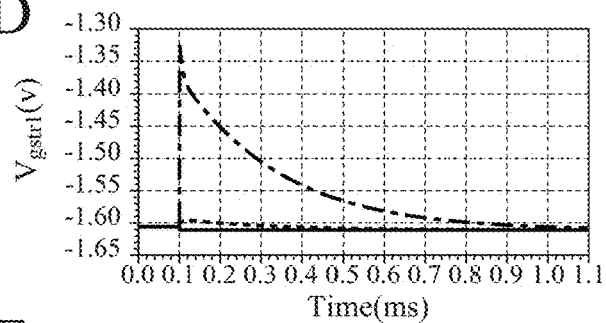
Figure 14E:
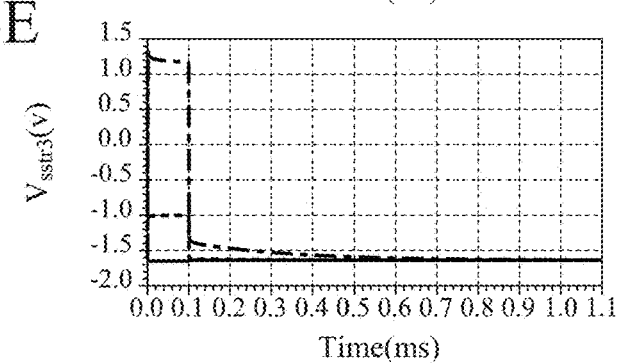

FIGS. 14A to 14E are explanatory diagrams each illustrating a transient response when the level of the large signal power output from the Pin 2 during the high Pin period is changed to 10 dBm, 15 dBm, and 20 dBm in the amplifier including the bias circuit 10 according to the seventh embodiment. FIG. 14A illustrates a transient response of Pin, FIG. 14B illustrates a transient response of Pout, FIG. 14C illustrates a transient response of δ Gain, FIG. 14D illustrates a transient response of $V_{gstr1}(t)$ and d FIG. 14E illustrates a transient response of $V_{sstr3}(t)$.

According to FIGS. 13A to 13E, in the first embodiment, the voltage $V_{gstr1}(t)$ during the low Pin period uniformly changes from a high voltage to a low voltage regardless of the level of the large signal power output from the Pin 2 during the high Pin period (FIG. 13D).

On the other hand, according to FIGS. 14A to 14E, it can be seen that in the seventh embodiment, the voltage $V_{gstr1}(t)$ during the low Pin period changes from a high voltage to a low voltage when the level of the large signal power output from the Pin 2 during the high Pin period is large, but hardly changes when the level of the large signal power output from the Pin 2 during the high Pin period is small (FIG. 14D).

In addition, as for the change in gain, for example, when the level of the large signal power output from the Pin 2 during the high Pin period is 10 dBm, the change in gain (δ Gain1) in the first embodiment is 1.7 dB (FIG. 13C), whereas the change in gain (δ Gain2) in the seventh embodiment is 0.6 dB (FIG. 14C), and it can be seen that the change in gain can be reduced as compared with the first embodiment.

Note that the configuration related to the amplifier described in the fifth embodiment described above may be applied to the amplifier described in the seventh embodiment. That is, in the amplifier illustrated in FIG. 12, each of the FET which is the amplifier element 1, the FET which is the switching element 11, the FET which is the trap compensation element 12, the first resistor 13a, the second resistor 13b, the third resistor 13c, the fourth resistor 13d, and the first capacitor 13e may be integrated on one chip. As a result, also in the seventh embodiment, the same effects as those described in the fifth embodiment can be obtained.

Eighth Embodiment

In an eighth embodiment, a configuration in which the functions of the control circuit 13 and the voltage application circuit 28 described in the seventh embodiment are integrated into one control circuit 29 will be described.

Figure 15:
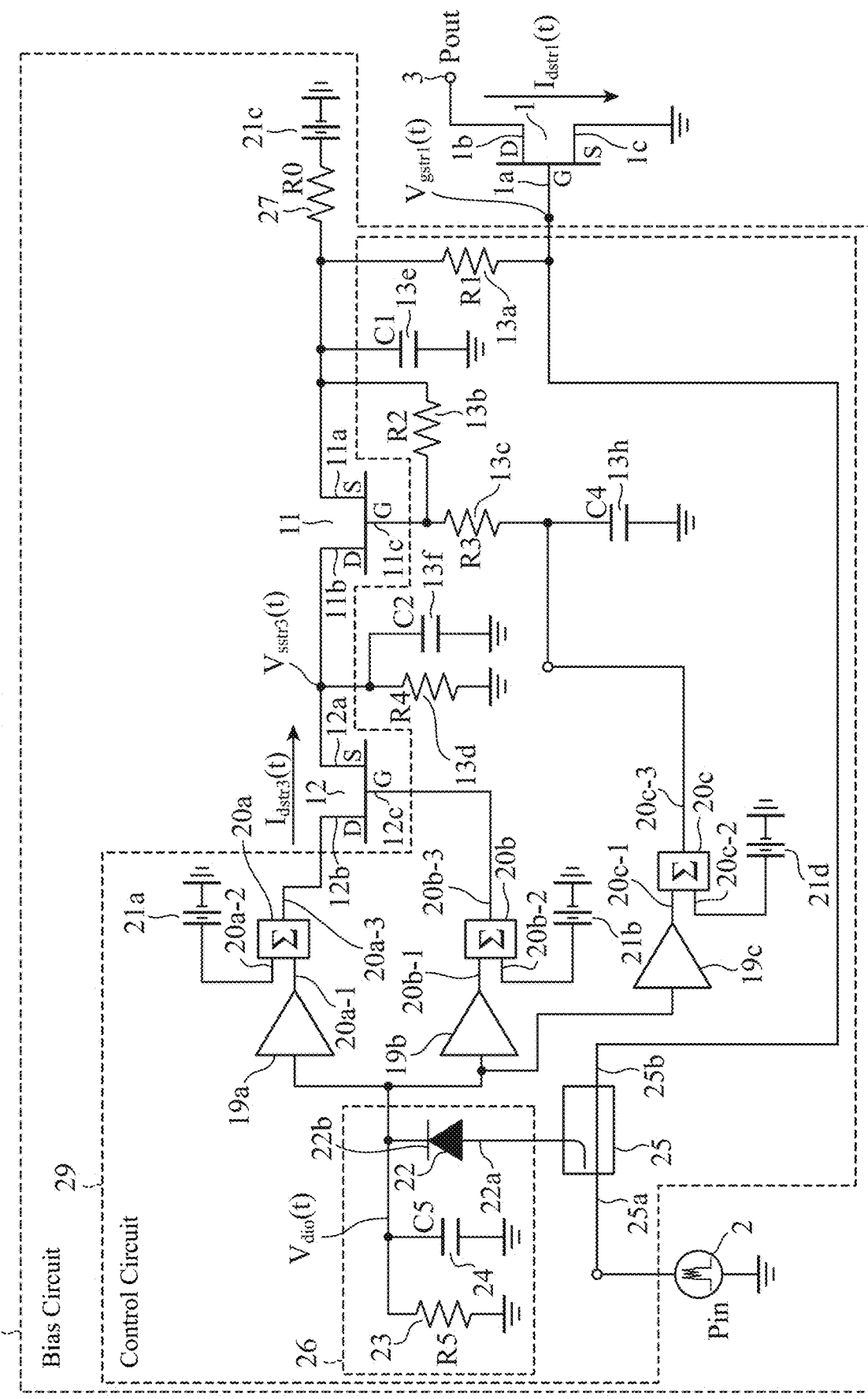
FIG. 15 is a configuration diagram illustrating an amplifier including a bias circuit 10 according to an eighth embodiment.

FIG. 15 is a configuration diagram illustrating an amplifier including a bias circuit 10 according to the eighth embodiment. In FIG. 15, the same reference numerals as those in FIG. 12 denote the same or corresponding parts, and thus description thereof is omitted.

The bias circuit 10 illustrated in FIG. 15 includes the control circuit 29. The control circuit 29 is obtained by adding a third operational amplifier 19c, a third adder 20c, and a power supply 21d to the voltage application circuit 28 described in the seventh embodiment illustrated in FIG. 12. In the bias circuit 10, the power supply 13i included in the control circuit 13 described in the seventh embodiment is omitted, and the cathode terminal 22b of the diode 22 is connected to the point where the power supply 13i is connected via the third operational amplifier 19c, the third adder 20c, and the power supply 21d.

The control circuit 29 applies a bias voltage to the gate terminal 1a, and when the signal to be amplified is a transmission signal, the control circuit 29 performs control to cause the switching element 11 to be in an open state, and performs control to apply a first voltage corresponding to a power level of the transmission signal to the fourth terminal 12b of the trap compensation element 12, and apply a second voltage to the control terminal 12c of the trap compensation element 12, and cause the third terminal 12a and the fourth terminal 12b in the trap compensation element 12 to be in a non-conductive state in which they are electrically disconnected from each other. Further, when the signal to be amplified is a reception signal, the control circuit 29 performs control to cause the switching element 11 to be in a closed state and control to cause the third terminal 12a and the fourth terminal 12b of the trap compensation element 12 to be in a conductive state in which they are electrically connected to each other.

The input terminal of the third operational amplifier 19c is connected to each of one end of the resistor 23, one end of the capacitor 24, the cathode terminal 22b of the diode 22, the input terminal of the first operational amplifier 19a, and the input terminal of the second operational amplifier 19b.

An output terminal of the third operational amplifier 19c is connected to a first input terminal 20c-1 described later of the third adder 20c.

The third adder 20c has a first input terminal 20c-1, a second input terminal 20c-2, and an output terminal 20c-3.

The first input terminal 20c-1 is connected to the output terminal of the third operational amplifier 19c.

The second input terminal 20c-2 is connected to one end of the power supply 21d.

The output terminal 20c-3 is connected to each of the other end of the third resistor 13c and one end of the fourth capacitor 13h.

One end of the power supply 21d is connected to the second input terminal 20c-2 of the third adder 20c.

The other end of the power supply 21d is connected to the ground.

Next, the operation of the amplifier illustrated in FIG. 15 will be described.

The Pin 2 outputs large signal power in a pulsed manner during the high Pin period. The signal of the large signal power output from the Pin 2 is input from the input terminal 25a of the coupler 25 to the coupler 25. The coupler 25 branches the input signal, and outputs the branched signals to each of the first output terminal 25b and the second output terminal 25c.

The signal output from the first output terminal 25b is adjusted by the power supply 21c so that the voltage is $V_{gq}$ that is a desired gate bias to be applied to the gate terminal 1a of the amplifier element 1 when the signal to be amplified is a transmission signal, and the adjusted voltage $V_{gq}$ is input to the gate terminal 1a of the amplifier element 1.

The signal output from the second output terminal 25c is input to the detector 26, and the voltage $V_{dio}(t)$ is detected by the detector 26.

Here, when the level of the large signal power output from the Pin 2 increases during the high Pin period, the voltage $V_{dio}(t)$ detected by the detector 26 increases. The voltage $V_{dio}(t)$ detected by the detector 26 is amplified by the first operational amplifier 19a, and the amplified voltage is applied to the first adder 20a. In addition, the voltage $V_{dio}(t)$ detected by the detector 26 is amplified by the second operational amplifier 19b, and the amplified voltage is applied to the second adder 20b. Further, the voltage $V_{dio}(t)$ detected by the detector 26 is amplified by the third operational amplifier 19c, and the amplified voltage is applied to the third adder 20c.

The operations subsequent to the first adder 20a and the second adder 20b are similar to those of the voltage application circuit 28 described in the seventh embodiment, and thus the description thereof will be omitted again.

The third adder 20c performs voltage adjustment between the voltage amplified by the third operational amplifier 19c and the voltage applied from the power supply 21d, and applies the adjusted voltage to the control terminal 11c of the switching element 11. The absolute value $|V_s|$ of the threshold voltage $V_s$ of the FET that is the switching element 11 is set to a value higher than the absolute value of the adjusted voltage. Therefore, the switching element 11 is brought into an open state. That is, the first terminal 11a and the second terminal 11b in the switching element 11 are brought into a non-conductive state in which they are electrically disconnected from each other.

Also during the low Pin period, the third adder 20c similarly performs voltage adjustment between the voltage amplified by the third operational amplifier 19c and the voltage applied from the power supply 21d, and applies the adjusted voltage to the control terminal 11c of the switching element 11. The absolute value $|V_s|$ of the threshold voltage $V_s$ of the FET that is the switching element 11 is set to a value lower than the absolute value of the adjusted voltage. Therefore, the switching element 11 is brought into a closed state. That is, the first terminal 11a and the second terminal 11b in the switching element 11 are brought into a conductive state in which they are electrically connected to each other.

As described above, the amplifier including the bias circuit 10 according to the eighth embodiment has the same effects as those of the amplifier including the bias circuit 10 according to the seventh embodiment, and the power supply 13i included in the bias circuit 10 according to the seventh embodiment can be omitted.

Note that the configuration related to the amplifier described in the fifth embodiment described above may be applied to the amplifier described in the eighth embodiment. That is, in the amplifier illustrated in FIG. 15, each of the FET which is the amplifier element 1, the FET which is the switching element 11, the FET which is the trap compensation element 12, the first resistor 13a, the second resistor 13b, the third resistor 13c, the fourth resistor 13d, and the first capacitor 13e may be integrated on one chip. As a result, also in the eighth embodiment, the same effects as those described in the fifth embodiment can be obtained.

Ninth Embodiment

In a ninth embodiment, a configuration in which the Pin 2 described in the eighth embodiment is replaced with a modulation wave input signal source and a signal (RF pulse signal) output from the Pin 2 is replaced with a modulation wave input signal for communication use will be described.

Figure 16:
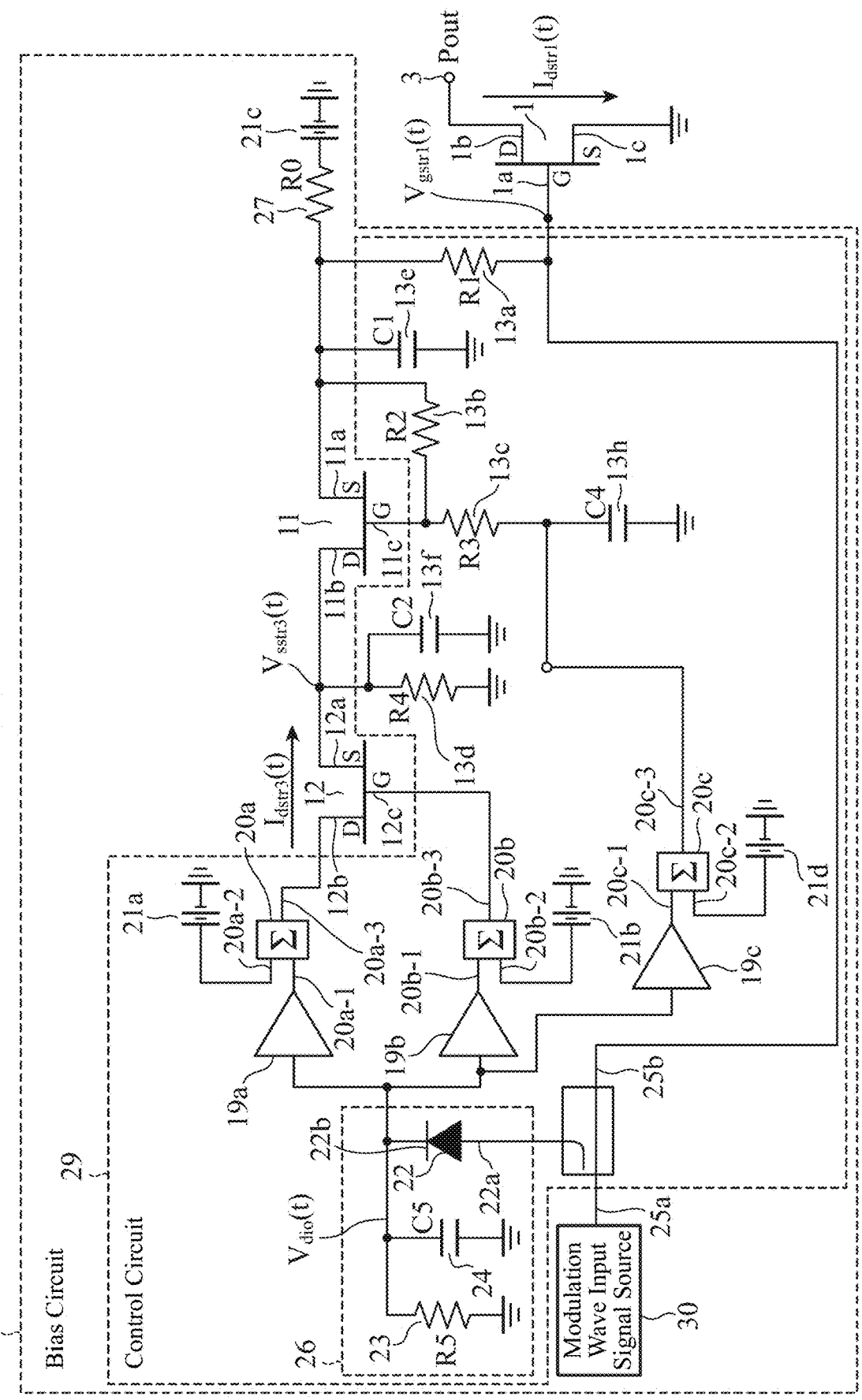
FIG. 16 is a configuration diagram illustrating an amplifier including a bias circuit 10 according to a ninth embodiment.

FIG. 16 is a configuration diagram illustrating an amplifier including a bias circuit 10 according to the ninth embodiment. In FIG. 16, the same reference numerals as those in FIG. 15 denote the same or corresponding parts, and thus description thereof is omitted.

In the amplifier illustrated in FIG. 16, the Pin 2 included in the amplifier described in the eighth embodiment illustrated in FIG. 15 is replaced with a modulation wave input signal source 30, and an output terminal of the modulation wave input signal source 30 is connected to the input terminal 25a of the coupler 25.

The modulation wave signal is an envelope signal of a carrier wave, and is a signal that repeats a high Pin period and a low Pin period similarly to the RF pulse signal output from the Pin 2. Therefore, even if the RF pulse signal is replaced with a modulation wave input signal, an effect similar to that of the amplifier including the bias circuit 10 according to the eighth embodiment can be obtained, and a memory effect (charge and discharge of electrons) by the trap compensation element 12 can be compensated.

Note that the configuration related to the amplifier described in the fifth embodiment described above may be applied to the amplifier described in the ninth embodiment. That is, in the amplifier illustrated in FIG. 16, each of the FET which is the amplifier element 1, the FET which is the switching element 11, the FET which is the trap compensation element 12, the first resistor 13a, the second resistor 13b, the third resistor 13c, the fourth resistor 13d, and the first capacitor 13e may be integrated on one chip. As a result, also in the ninth embodiment, the same effects as those described in the fifth embodiment can be obtained.

Tenth Embodiment

In a tenth embodiment, a configuration will be described in which the voltage (drain voltage) applied to the fourth terminal 12b of the trap compensation element 12 and the voltage (gate voltage) applied to the control terminal 12c of the trap compensation element 12 are directly controlled by a digital signal in accordance with the level of the large signal power output from the Pin 2 during the high Pin period.

Figure 17:
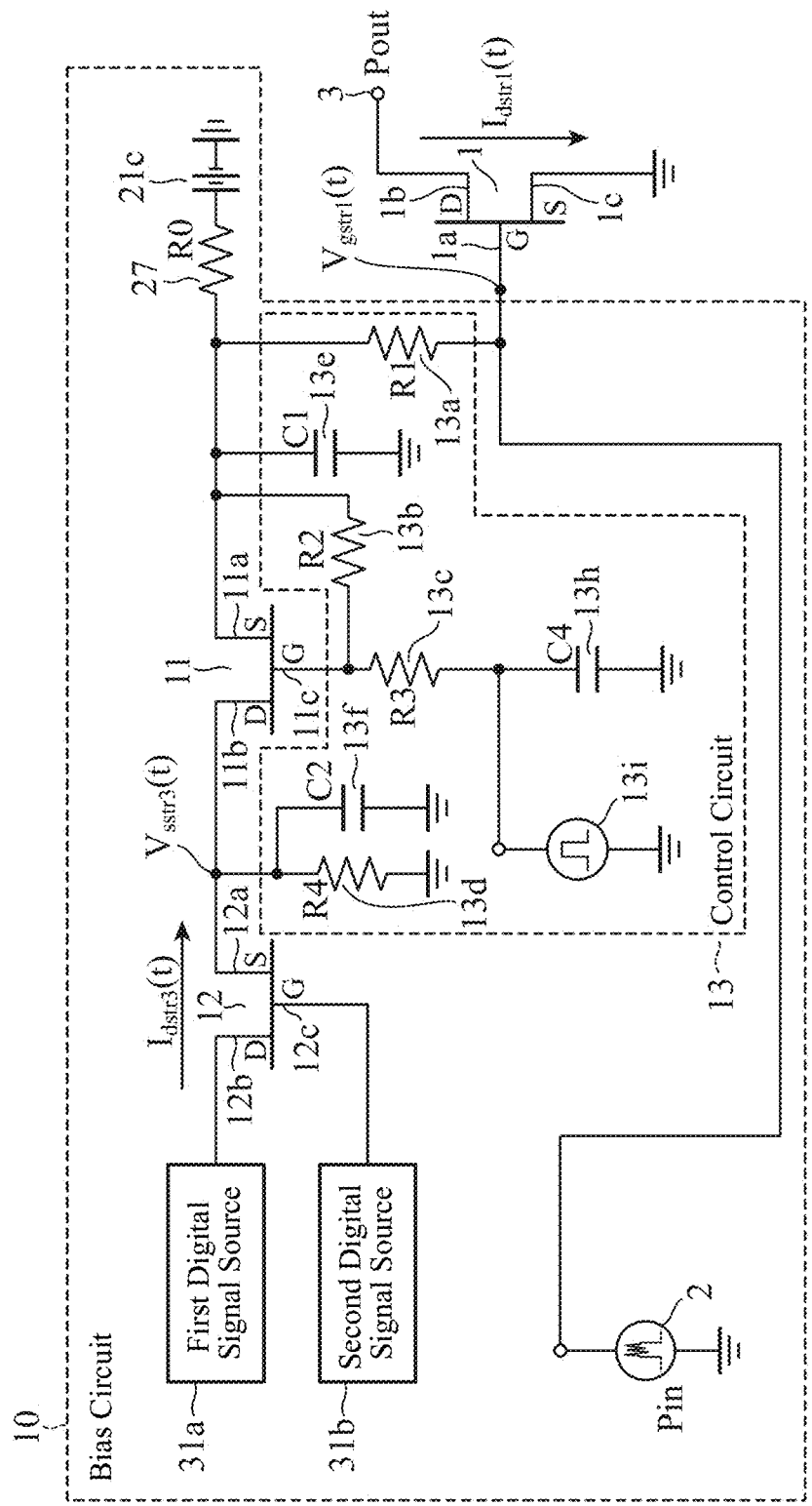
FIG. 17 is a configuration diagram illustrating an amplifier including a bias circuit 10 according to a tenth embodiment.

FIG. 17 is a configuration diagram illustrating an amplifier including a bias circuit 10 according to the tenth embodiment. In FIG. 17, the same reference numerals as those in FIG. 12 denote the same or corresponding parts, and thus description thereof is omitted.

The amplifier illustrated in FIG. 17 includes a first digital signal source 31a and a second digital signal source 31b instead of the voltage application circuit 28 described in FIG. 12.

An output terminal of the first digital signal source 31a is connected to the fourth terminal 12b of the trap compensation element 12.

An output terminal of the second digital signal source 31b is connected to the control terminal 12c of the trap compensation element 12.

The first digital signal source 31a controls the voltage (drain voltage) applied to the fourth terminal 12b of the trap compensation element 12 by a digital signal in accordance with the level of the large signal power output from the Pin 2 during the high Pin period.

The second digital signal source 31b controls the voltage (gate voltage) applied to the control terminal 12c of the trap compensation element 12 by a digital signal in accordance with the level of the large signal power output from the Pin 2 during the high Pin period.

Also in the amplifier including the bias circuit 10 according to the tenth embodiment, the voltage $V_{gstr1}(t)$ applied to the gate terminal 1a of the amplifier element 1 during the low Pin period changes in accordance with the level of the large signal power output from the Pin 2 during the high Pin period, so that it is possible to obtain an effect similar to that of the amplifier including the bias circuit 10 according to the seventh embodiment.

Note that the configuration related to the amplifier described in the fifth embodiment described above may be applied to the amplifier described in the tenth embodiment. That is, in the amplifier illustrated in FIG. 16, each of the FET which is the amplifier element 1, the FET which is the switching element 11, the FET which is the trap compensation element 12, the first resistor 13a, the second resistor 13b, the third resistor 13c, the fourth resistor 13d, and the first capacitor 13e may be integrated on one chip. As a result, also in the tenth embodiment, the same effects as those described in the fifth embodiment can be obtained.

It should be noted that the present disclosure can freely combine the embodiments, modify any constituent element of each embodiment, or omit any constituent element in each embodiment.

INDUSTRIAL APPLICABILITY

The present disclosure is suitable for a bias circuit.

In addition, the present disclosure is suitable for an amplifier including a bias circuit.

REFERENCE SIGNS LIST

1: Amplifier element, 1a: Gate terminal, 1b: Drain terminal, 1c: Source terminal, 2: Pin, 3: Signal output terminal, 10: Bias circuit, 11: Switching element, 11a: First terminal, 11b: Second terminal, 11c: Control terminal, 12: Trap compensation element, 12a: Third terminal, 12b: Fourth terminal, 12c: Control terminal, 13: Control circuit, 13a: First resistor, 13b: Second resistor, 13c: Third resistor, 13d: Fourth resistor, 13e: First capacitor, 13f: Second capacitor, 13g: Third capacitor, 13h: Fourth capacitor, 13i: Power supply, 14: Voltage application circuit, 14a: Power supply, 15: Switching element, 15a: First terminal, 15b: Second terminal, 16: Switching element, 16a: First terminal, 16b: Second terminal, 16c: Control terminal, 17: Voltage application circuit, 18: Negative feedback amplifier, 18a: Resistor, 18b: Resistor, 18c: Operational amplifier, 19a: First operational amplifier, 19b: Second operational amplifier, 19c: Third operational amplifier, 20a: First adder, 20a-1: First input terminal, 20a-2: Second input terminal, 20a-3: Output terminal, 20b: Second adder, 20b-1: First input terminal, 20b-2: Second input terminal, 20b-3: Output terminal, 20c: Third adder, 20c-1: First input terminal, 20c-2: Second input terminal, 20c-3: Output terminal, 21a: Power supply, 21b: Power supply, 21c: Power supply, 21d: Power supply, 22: Diode, 22a: Anode terminal, 22b: Cathode terminal, 23: Resistor, 24: Capacitor, 25: Coupler, 25a: Input terminal, 25b: First output terminal, 25c: Second output terminal, 26: Detector, 27: Resistor, 28: Voltage application circuit, 29: Control circuit, 30: Modulation wave input signal source, 31a: First digital signal source, 31b: Second digital signal source

What is claimed is:

1. A bias circuit in which a signal to be amplified is applied to a gate terminal of an amplifier element that amplifies the signal and that is a transistor, the bias circuit comprises:

a switching element having a first terminal and a second terminal, the first terminal being electrically connected to the gate terminal of the amplifier element;

a trap compensation element having a third terminal and a fourth terminal, the third terminal being connected to the second terminal;

a control circuit to apply a bias voltage to the gate terminal of the amplifier element, wherein when the signal to be amplified is a transmission signal, the control circuit performs control to cause the switching element to be in an open state and control to cause the third terminal and the fourth terminal in the trap compensation element to be in a non-conductive state in which the third terminal and the fourth terminal are electrically disconnected from each other, and when the signal to be amplified is a reception signal, the control circuit performs control to cause the switching element to be in a closed state and control to cause the third terminal and the fourth terminal to be in a conductive state in which the third terminal and the fourth terminal are electrically connected to each other; and a voltage application circuit to apply a first voltage to the fourth terminal when the signal to be amplified is a transmission signal, and apply a second voltage to the fourth terminal when the signal to be amplified is a reception signal, the second voltage being a negative voltage.

2. The bias circuit according to claim 1, wherein the amplifier element is a transistor including a crystal defect, wherein when the signal to be amplified is a transmission signal, the voltage application circuit charges electrons to the crystal defect included in the trap compensation element by applying the first voltage to the fourth terminal.

3. The bias circuit according to claim 1, wherein the bias circuit uses a field effect transistor as the switching element, and a source terminal of the field effect transistor is the first terminal of the switching element, and a drain terminal of the field effect transistor is the second terminal of the switching element.

4. The bias circuit according to claim 1, wherein the bias circuit uses a diode as the switching element, and an anode terminal of the diode is the first terminal of the switching element, and a cathode terminal of the diode is the second terminal of the switching element.

5. The bias circuit according to claim 4, wherein a Schottky barrier metal forming the anode terminal of the diode is a metal having a lower work function than a Schottky barrier metal forming the gate terminal of the amplifier element.

6. The bias circuit according to claim 1, wherein the bias circuit uses a switch as the switching element.

7. The bias circuit according to claim 1, wherein the bias circuit uses, as the voltage application circuit, a power supply to apply either the first voltage or the second voltage to the fourth terminal of the trap compensation element.

8. The bias circuit according to claim 1, wherein the bias circuit uses, as the voltage application circuit, a negative feedback amplifier to invert a control voltage output from the control circuit to the trap compensation element and apply a voltage obtained by amplifying the inverted control voltage to the fourth terminal of the trap compensation element as the first voltage or the second voltage in order to control a state of the trap compensation element to either a non-conductive state or a conductive state.

9. The bias circuit according to claim 1, wherein each of the amplifier element, the switching element, and the trap compensation element is a gallium nitride transistor.

10. A bias circuit in which a signal to be amplified is applied to a gate terminal of an amplifier element that amplifies the signal and that is a transistor, the bias circuit comprises:

a switching element having a first terminal and a second terminal, the first terminal being electrically connected to the gate terminal of the amplifier element;

a trap compensation element having a third terminal, a fourth terminal, and a control terminal, the third terminal being connected to the second terminal;

a control circuit to apply a bias voltage to the gate terminal of the amplifier element, wherein when the signal to be amplified is a transmission signal, the control circuit performs control to cause the switching element to be in an open state, and when the signal to be amplified is a reception signal, the control circuit performs control to cause the switching element to be in a closed state; and a voltage application circuit to apply, when the signal to be amplified is a transmission signal, a first voltage corresponding to a power level of the transmission signal to the fourth terminal of the trap compensation element and apply a second voltage to the control terminal of the trap compensation element, and perform control to cause the third terminal and the fourth terminal in the trap compensation element to be in a non-conductive state in which the third terminal and the fourth terminal are electrically disconnected from each other, and to perform, when the signal to be amplified is a reception signal, control to cause the third terminal and the fourth terminal to be in a conductive state in which the third terminal and the fourth terminal are electrically connected to each other.

11. A bias circuit in which a signal to be amplified is applied to a gate terminal of an amplifier element that amplifies the signal and that is a transistor, the bias circuit comprises:

a switching element having a first terminal and a second terminal, the first terminal being electrically connected to the gate terminal of the amplifier element;

a trap compensation element having a third terminal, a fourth terminal, and a control terminal, the third terminal being connected to the second terminal; and a control circuit to apply a bias voltage to the gate terminal of the amplifier element, wherein when the signal to be amplified is a transmission signal, the control circuit performs control to cause the switching element to be in an open state, and perform control to apply a first voltage corresponding to a power level of the transmission signal to the fourth terminal of the trap compensation element and apply a second voltage to the control terminal of the trap compensation element, and cause the third terminal and the fourth terminal in the trap compensation element to be in a non-conductive state in which the third terminal and the fourth terminal are electrically disconnected from each other, and when the signal to be amplified is a reception signal, the control circuit performs control to cause the switching element to be in a closed state and control to cause the third terminal and the fourth terminal to be in a conductive state in which the third terminal and the fourth terminal are electrically connected to each other.

12. The bias circuit according to claim 10, wherein the signal to be amplified is a modulation wave input signal.

13. An amplifier comprising:

a transistor that is an amplifier element to amplify a signal to be amplified, the signal being applied to a gate terminal; and a bias circuit to apply a voltage to the gate terminal of the transistor, wherein the bias circuit is the bias circuit according to claim 1.

14. An amplifier comprising:

a transistor that is an amplifier element to amplify a signal to be amplified, the signal being applied to a gate terminal; and a bias circuit to apply a voltage to the gate terminal of the transistor, wherein the bias circuit is the bias circuit according to claim 10.

15. An amplifier comprising:

a transistor that is an amplifier element to amplify a signal to be amplified, the signal being applied to a gate terminal; and a bias circuit to apply a voltage to the gate terminal of the transistor, wherein the bias circuit is the bias circuit according to claim 11.

16. The amplifier according to claim 13, wherein each of the amplifier element, the switching element, and the trap compensation element is mounted on the same substrate.

17. The amplifier according to claim 14, wherein each of the amplifier element, the switching element, and the trap compensation element is mounted on the same substrate.

18. The amplifier according to claim 15, wherein each of the amplifier element, the switching element, and the trap compensation element is mounted on the same substrate.

* * * * *